United States Patent
Sinha et al.

(10) Patent No.: US 8,281,392 B2
(45) Date of Patent: Oct. 2, 2012

(54) METHODS AND SYSTEMS FOR WIRED EQUIVALENT PRIVACY AND WI-FI PROTECTED ACCESS PROTECTION

(75) Inventors: Amit Sinha, Marlborough, MA (US); Nicholas John Darrow, Alpharetta, GA (US)

(73) Assignee: Airdefense, Inc., Alpharetta, GA (US)

( * ) Notice: Subject to any disclaimer, the term of this patent is extended or adjusted under 35 U.S.C. 154(b) by 1369 days.

(21) Appl. No.: 11/464,043

(22) Filed: Aug. 11, 2006

(65) Prior Publication Data

US 2008/0052779 A1  Feb. 28, 2008

(51) Int. Cl.
*H04L 29/06* (2006.01)

(52) U.S. Cl. .......... 726/22; 713/150; 713/151; 713/153; 713/160; 713/168

(58) Field of Classification Search ...................... 726/22
See application file for complete search history.

(56) References Cited

U.S. PATENT DOCUMENTS

| | | |
|---|---|---|
| 5,077,753 A | 12/1991 | Grau, Jr. et al. |
| 5,231,634 A | 7/1993 | Giles et al. |
| 5,237,614 A | 8/1993 | Weiss |
| 5,339,316 A | 8/1994 | Diepstraten |
| 5,355,522 A | 10/1994 | Demange |
| 5,393,965 A | 2/1995 | Bravman et al. |
| 5,487,069 A | 1/1996 | O'Sullivan et al. |
| 5,577,209 A | 11/1996 | Boyle et al. |
| 5,636,344 A | 6/1997 | Lewis |
| 5,646,389 A | 7/1997 | Bravman et al. |
| 5,666,662 A | 9/1997 | Shibuya |
| 5,684,967 A | 11/1997 | McKenna et al. |
| 5,710,885 A | 1/1998 | Bondi |
| 5,715,396 A | 2/1998 | Chatwani et al. |
| 5,737,328 A | 4/1998 | Norman et al. |
| 5,745,479 A | 4/1998 | Burns et al. |
| 5,745,483 A | 4/1998 | Nakagawa et al. |
| 5,768,312 A | 6/1998 | Imamura |
| 5,781,857 A | 7/1998 | Hwang et al. |
| 5,787,077 A | 7/1998 | Kuehnel et al. |
| 5,787,350 A | 7/1998 | van der Vorm et al. |
| 5,796,942 A | 8/1998 | Esbensen |

(Continued)

FOREIGN PATENT DOCUMENTS

WO  WO 98/59428  12/1998

(Continued)

OTHER PUBLICATIONS

Karlof et al., TinySec: A Link Layer Security Architecture for Wireless Sensor Networks, Nov. 2004, SenSys '04 Proceedings of the 2nd international conference on Embedded networked sensor systems, pp. 162-175.*

(Continued)

*Primary Examiner* — Taghi Arani
*Assistant Examiner* — Kenneth Chang
(74) *Attorney, Agent, or Firm* — Clements Bernard PLLC; Lawrence A. Baratta, Jr.; Christopher L. Bernard

(57) ABSTRACT

Methods and systems for disrupting potential attacks on a wireless network through transmission of random data are disclosed. Specifically, this disclosure relates to systems and methods for disrupting the breaking of the secret key or passphrase by an adversary or rogue device for Wi-Fi networks using wired equivalent privacy (WEP) and Wi-Fi protected access (WPA).

17 Claims, 9 Drawing Sheets

U.S. PATENT DOCUMENTS

| | | | |
|---|---|---|---|
| 5,809,060 A | 9/1998 | Cafarella et al. | |
| 5,825,817 A | 10/1998 | Tanaka et al. | |
| 5,844,900 A | 12/1998 | Hong et al. | |
| 5,866,888 A | 2/1999 | Bravman et al. | |
| 5,870,666 A | 2/1999 | Tanaka et al. | |
| 5,875,179 A | 2/1999 | Tikalsky | |
| 5,896,499 A | 4/1999 | McKelvey | |
| 5,903,848 A | 5/1999 | Takahashi | |
| 5,913,174 A | 6/1999 | Casarez et al. | |
| 5,919,258 A | 7/1999 | Kayashima et al. | |
| 5,926,745 A * | 7/1999 | Threadgill et al. | 455/12.1 |
| 5,940,591 A | 8/1999 | Boyle et al. | |
| 5,948,055 A | 9/1999 | Pulsipher et al. | |
| 5,953,652 A | 9/1999 | Amin et al. | |
| 5,987,609 A | 11/1999 | Hasebe | |
| 6,006,090 A | 12/1999 | Coleman et al. | |
| 6,029,144 A | 2/2000 | Barrett et al. | |
| 6,055,316 A * | 4/2000 | Perlman et al. | 380/262 |
| 6,058,482 A | 5/2000 | Liu | |
| 6,067,297 A | 5/2000 | Beach | |
| 6,070,244 A | 5/2000 | Orchier et al. | |
| 6,104,712 A | 8/2000 | Robert et al. | |
| 6,119,230 A | 9/2000 | Carter | |
| 6,122,757 A | 9/2000 | Kelley | |
| 6,141,535 A | 10/2000 | Ayerst | |
| 6,141,778 A | 10/2000 | Kane et al. | |
| 6,145,083 A | 11/2000 | Shaffer et al. | |
| 6,151,031 A | 11/2000 | Atkins et al. | |
| 6,151,357 A | 11/2000 | Jawahar et al. | |
| 6,158,010 A | 12/2000 | Moriconi et al. | |
| 6,178,512 B1 | 1/2001 | Fifield | |
| 6,185,423 B1 | 2/2001 | Brown et al. | |
| 6,185,612 B1 | 2/2001 | Jensen et al. | |
| 6,185,689 B1 | 2/2001 | Todd, Sr. et al. | |
| 6,188,681 B1 | 2/2001 | Vesuna | |
| 6,202,157 B1 | 3/2001 | Brownlie et al. | |
| 6,205,551 B1 | 3/2001 | Grosse | |
| 6,208,247 B1 | 3/2001 | Agre et al. | |
| 6,240,077 B1 | 5/2001 | Vuong et al. | |
| 6,272,129 B1 | 8/2001 | Dynarski et al. | |
| 6,272,172 B1 | 8/2001 | Deshpande et al. | |
| 6,279,037 B1 | 8/2001 | Tams et al. | |
| 6,282,546 B1 | 8/2001 | Gleichauf et al. | |
| 6,289,214 B1 | 9/2001 | Backstrom | |
| 6,292,508 B1 | 9/2001 | Hong et al. | |
| 6,301,668 B1 | 10/2001 | Gleichauf et al. | |
| 6,301,699 B1 | 10/2001 | Hollander et al. | |
| 6,304,973 B1 | 10/2001 | Williams | |
| 6,317,829 B1 | 11/2001 | Van Oorschot | |
| 6,320,948 B1 | 11/2001 | Heilmann et al. | |
| 6,321,338 B1 | 11/2001 | Porras et al. | |
| 6,324,647 B1 | 11/2001 | Bowman-Amuah | |
| 6,324,656 B1 | 11/2001 | Gleichauf et al. | |
| 6,330,244 B1 | 12/2001 | Swartz et al. | |
| 6,356,282 B2 | 3/2002 | Roytman et al. | |
| 6,363,477 B1 | 3/2002 | Fletcher et al. | |
| 6,400,752 B1 | 6/2002 | Suzuki et al. | |
| 6,404,772 B1 | 6/2002 | Beach et al. | |
| 6,408,391 B1 | 6/2002 | Huff et al. | |
| 6,411,608 B2 | 6/2002 | Sharony | |
| 6,453,159 B1 | 9/2002 | Lewis | |
| 6,453,345 B2 | 9/2002 | Trcka et al. | |
| 6,466,608 B1 | 10/2002 | Hong et al. | |
| 6,470,384 B1 | 10/2002 | O'Brien et al. | |
| 6,473,449 B1 | 10/2002 | Cafarella et al. | |
| 6,477,198 B1 | 11/2002 | Gumm | |
| 6,484,029 B2 | 11/2002 | Hughes et al. | |
| 6,487,666 B1 | 11/2002 | Shanklin et al. | |
| 6,499,107 B1 | 12/2002 | Gleichauf et al. | |
| 6,501,951 B2 | 12/2002 | Moore | |
| 6,507,864 B1 | 1/2003 | Klein et al. | |
| 6,522,689 B1 | 2/2003 | Heinrich | |
| 6,539,207 B1 | 3/2003 | del Castillo et al. | |
| 6,539,428 B2 | 3/2003 | Davies | |
| 6,567,859 B1 | 5/2003 | Yang et al. | |
| 6,590,891 B1 | 7/2003 | Jacquet et al. | |
| 6,628,642 B1 | 9/2003 | Mile'n et al. | |
| 6,665,269 B1 | 12/2003 | Schmitz | |
| 6,674,403 B2 | 1/2004 | Gray et al. | |
| 6,697,337 B1 | 2/2004 | Cafarelli et al. | |
| 6,708,212 B2 | 3/2004 | Porras et al. | |
| 6,735,701 B1 | 5/2004 | Jacobson | |
| 6,745,333 B1 | 6/2004 | Thomsen | |
| 6,751,752 B1 | 6/2004 | Smith | |
| 6,754,488 B1 | 6/2004 | Won et al. | |
| 6,766,165 B2 | 7/2004 | Sharma et al. | |
| 6,789,117 B1 | 9/2004 | Joiner et al. | |
| 6,799,047 B1 | 9/2004 | Bahl et al. | |
| 6,839,850 B1 | 1/2005 | Campbell et al. | |
| 6,850,736 B2 | 2/2005 | McCune, Jr. | |
| 6,865,185 B1 | 3/2005 | Patel et al. | |
| 6,870,815 B2 | 3/2005 | McFarland et al. | |
| 6,874,089 B2 | 3/2005 | Dick et al. | |
| 6,910,135 B1 | 6/2005 | Grainger | |
| 6,915,123 B1 | 7/2005 | Daudelin et al. | |
| 6,920,494 B2 | 7/2005 | Heitman et al. | |
| 6,934,298 B2 | 8/2005 | Bentley | |
| 6,978,023 B2 | 12/2005 | Dacosta | |
| 7,019,639 B2 | 3/2006 | Stilp | |
| 7,039,330 B2 | 5/2006 | Lenosky | |
| 7,042,988 B2 | 5/2006 | Juitt et al. | |
| 7,043,759 B2 | 5/2006 | Kaashoek et al. | |
| 7,054,627 B1 | 5/2006 | Hillman | |
| 7,058,414 B1 | 6/2006 | Rofheart et al. | |
| 7,068,998 B2 | 6/2006 | Zavidniak | |
| 7,076,803 B2 | 7/2006 | Bruton, III et al. | |
| 7,086,089 B2 | 8/2006 | Hrastar et al. | |
| 7,110,756 B2 | 9/2006 | Diener | |
| 7,135,976 B2 | 11/2006 | Neff et al. | |
| 7,158,484 B1 | 1/2007 | Ahmed et al. | |
| 7,167,715 B2 | 1/2007 | Stanforth | |
| 7,174,566 B2 | 2/2007 | Yadav | |
| 7,194,004 B1 | 3/2007 | Thomsen | |
| 7,218,643 B1 | 5/2007 | Saito et al. | |
| 7,302,704 B1 | 11/2007 | Elliott | |
| 7,366,202 B2 | 4/2008 | Scherzer et al. | |
| 7,613,920 B2 | 11/2009 | Gustave et al. | |
| 2001/0027107 A1 | 10/2001 | Shinozaki et al. | |
| 2001/0030956 A1 | 10/2001 | Chillariga et al. | |
| 2001/0033550 A1 | 10/2001 | Banwell et al. | |
| 2001/0038626 A1 | 11/2001 | Dynarski et al. | |
| 2001/0039579 A1 | 11/2001 | Trcka et al. | |
| 2002/0010798 A1 | 1/2002 | Ben-Shaul et al. | |
| 2002/0012320 A1 | 1/2002 | Ogier et al. | |
| 2002/0019857 A1 | 2/2002 | Harjanto | |
| 2002/0021745 A1 | 2/2002 | Negus | |
| 2002/0022491 A1 | 2/2002 | McCann et al. | |
| 2002/0029288 A1 | 3/2002 | Dobbins et al. | |
| 2002/0032871 A1 | 3/2002 | Malan et al. | |
| 2002/0035699 A1 | 3/2002 | Crosbie | |
| 2002/0044533 A1 | 4/2002 | Bahl et al. | |
| 2002/0059434 A1 | 5/2002 | Karaoguz et al. | |
| 2002/0060994 A1 | 5/2002 | Kovacs et al. | |
| 2002/0060995 A1 | 5/2002 | Cervello et al. | |
| 2002/0061031 A1 | 5/2002 | Sugar et al. | |
| 2002/0066034 A1 | 5/2002 | Schlossberg et al. | |
| 2002/0068559 A1 | 6/2002 | Sharma et al. | |
| 2002/0072329 A1 | 6/2002 | Bandeira et al. | |
| 2002/0075834 A1 | 6/2002 | Shah et al. | |
| 2002/0078382 A1 | 6/2002 | Sheikh et al. | |
| 2002/0083343 A1 | 6/2002 | Crosbie et al. | |
| 2002/0083344 A1 | 6/2002 | Vairavan | |
| 2002/0087882 A1 | 7/2002 | Schneier et al. | |
| 2002/0090089 A1 | 7/2002 | Branigan et al. | |
| 2002/0090952 A1 | 7/2002 | Cantwell | |
| 2002/0094777 A1 | 7/2002 | Cannon et al. | |
| 2002/0101837 A1 | 8/2002 | Bender et al. | |
| 2002/0112047 A1 | 8/2002 | Kushwaha et al. | |
| 2002/0112152 A1 * | 8/2002 | VanHeyningen et al. | 713/151 |
| 2002/0112185 A1 | 8/2002 | Hodges | |
| 2002/0129138 A1 | 9/2002 | Carter | |
| 2002/0138753 A1 | 9/2002 | Munson | |
| 2002/0138755 A1 | 9/2002 | Ko | |
| 2002/0144135 A1 | 10/2002 | Langford et al. | |
| 2002/0147920 A1 | 10/2002 | Mauro | |
| 2002/0160769 A1 | 10/2002 | Gray | |
| 2002/0161755 A1 | 10/2002 | Moriarty | |

| | | |
|---|---|---|
| 2002/0174364 A1 | 11/2002 | Nordman et al. |
| 2002/0176437 A1 | 11/2002 | Busch et al. |
| 2002/0178246 A1 | 11/2002 | Mayer |
| 2002/0178383 A1 | 11/2002 | Hrabik et al. |
| 2002/0181417 A1 | 12/2002 | Malhotra et al. |
| 2002/0188864 A1 | 12/2002 | Jackson |
| 2003/0009551 A1 | 1/2003 | Benfield et al. |
| 2003/0009696 A1 | 1/2003 | Bunker et al. |
| 2003/0014644 A1 | 1/2003 | Burns et al. |
| 2003/0021254 A1 | 1/2003 | Fukuda |
| 2003/0026198 A1 | 2/2003 | Diepstraten et al. |
| 2003/0027550 A1 | 2/2003 | Rockwell |
| 2003/0036404 A1 | 2/2003 | Adachi et al. |
| 2003/0046390 A1 | 3/2003 | Ball et al. |
| 2003/0048770 A1 | 3/2003 | Proctor, Jr. |
| 2003/0059052 A1* | 3/2003 | Cheng .................. 380/274 |
| 2003/0060207 A1 | 3/2003 | Sugaya et al. |
| 2003/0061344 A1 | 3/2003 | Monroe |
| 2003/0061506 A1 | 3/2003 | Cooper et al. |
| 2003/0063592 A1 | 4/2003 | Seki et al. |
| 2003/0063593 A1 | 4/2003 | Koyanagi et al. |
| 2003/0064720 A1 | 4/2003 | Valins et al. |
| 2003/0065934 A1 | 4/2003 | Angelo et al. |
| 2003/0067884 A1 | 4/2003 | Abler et al. |
| 2003/0069960 A1 | 4/2003 | Symons et al. |
| 2003/0070084 A1 | 4/2003 | Satomaa et al. |
| 2003/0084319 A1 | 5/2003 | Tarquini et al. |
| 2003/0084321 A1 | 5/2003 | Tarquini et al. |
| 2003/0084323 A1 | 5/2003 | Gales |
| 2003/0088683 A1 | 5/2003 | Kitamura et al. |
| 2003/0088789 A1 | 5/2003 | Fenton et al. |
| 2003/0093509 A1 | 5/2003 | Li et al. |
| 2003/0095520 A1 | 5/2003 | Aalbers et al. |
| 2003/0096577 A1 | 5/2003 | Heinonen et al. |
| 2003/0096607 A1 | 5/2003 | Taylor |
| 2003/0100308 A1 | 5/2003 | Rusch |
| 2003/0105881 A1 | 6/2003 | Symons et al. |
| 2003/0105976 A1 | 6/2003 | Copeland, III |
| 2003/0107512 A1 | 6/2003 | McFarland et al. |
| 2003/0108016 A1 | 6/2003 | Bonta |
| 2003/0110398 A1 | 6/2003 | Dacier et al. |
| 2003/0117966 A1 | 6/2003 | Chen |
| 2003/0117985 A1 | 6/2003 | Fujii et al. |
| 2003/0117986 A1 | 6/2003 | Thermond et al. |
| 2003/0119526 A1 | 6/2003 | Edge |
| 2003/0120821 A1 | 6/2003 | Thermond et al. |
| 2003/0123420 A1 | 7/2003 | Sherlock |
| 2003/0125035 A1 | 7/2003 | Khafizov et al. |
| 2003/0126258 A1 | 7/2003 | Conkright et al. |
| 2003/0135638 A1 | 7/2003 | Brabson et al. |
| 2003/0135762 A1 | 7/2003 | Macaulay |
| 2003/0140246 A1 | 7/2003 | Kammer et al. |
| 2003/0149888 A1 | 8/2003 | Yadav |
| 2003/0149891 A1* | 8/2003 | Thomsen .................. 713/201 |
| 2003/0154399 A1 | 8/2003 | Zuk et al. |
| 2003/0156552 A1 | 8/2003 | Banker et al. |
| 2003/0157895 A1 | 8/2003 | Agrawal et al. |
| 2003/0161341 A1 | 8/2003 | Wu et al. |
| 2003/0163729 A1 | 8/2003 | Buchegger |
| 2003/0174680 A1 | 9/2003 | Kuan et al. |
| 2003/0185244 A1 | 10/2003 | Wu et al. |
| 2003/0186679 A1 | 10/2003 | Challener et al. |
| 2003/0189908 A1 | 10/2003 | Kuan et al. |
| 2003/0192055 A1 | 10/2003 | Aoki et al. |
| 2003/0196115 A1 | 10/2003 | Karp |
| 2003/0200455 A1 | 10/2003 | Wu |
| 2003/0204632 A1 | 10/2003 | Willebeek-LeMair et al. |
| 2003/0210788 A1* | 11/2003 | Billhartz et al. ............ 380/270 |
| 2003/0212812 A1 | 11/2003 | Wang et al. |
| 2003/0217283 A1* | 11/2003 | Hrastar et al. ................ 713/200 |
| 2003/0217289 A1 | 11/2003 | Ammon et al. |
| 2003/0219008 A1 | 11/2003 | Hrastar et al. |
| 2003/0221006 A1 | 11/2003 | Kuan et al. |
| 2003/0224797 A1 | 12/2003 | Kuan et al. |
| 2003/0229808 A1 | 12/2003 | Heintz et al. |
| 2003/0233567 A1 | 12/2003 | Lynn et al. |
| 2003/0236990 A1 | 12/2003 | Hrastar et al. |
| 2003/0237000 A1 | 12/2003 | Denton et al. |
| 2004/0003285 A1 | 1/2004 | Whelan et al. |
| 2004/0008652 A1 | 1/2004 | Tanzella et al. |
| 2004/0054774 A1 | 3/2004 | Barber |
| 2004/0054925 A1 | 3/2004 | Etheridge et al. |
| 2004/0068668 A1 | 4/2004 | Lor et al. |
| 2004/0078598 A1 | 4/2004 | Barber et al. |
| 2004/0098610 A1 | 5/2004 | Hrastar |
| 2004/0102192 A1 | 5/2004 | Serceki |
| 2004/0103307 A1 | 5/2004 | Raphaeli et al. |
| 2004/0107219 A1 | 6/2004 | Rosenberger et al. |
| 2004/0107356 A1* | 6/2004 | Shamoon et al. ............. 713/193 |
| 2004/0111643 A1 | 6/2004 | Farmer |
| 2004/0136318 A1 | 7/2004 | Bentley |
| 2004/0162995 A1 | 8/2004 | Muaddi et al. |
| 2004/0165563 A1 | 8/2004 | Hsu et al. |
| 2004/0203764 A1 | 10/2004 | Hrastar et al. |
| 2004/0218602 A1 | 11/2004 | Hrastar |
| 2004/0235453 A1 | 11/2004 | Chen et al. |
| 2004/0236851 A1 | 11/2004 | Kuan et al. |
| 2004/0247125 A1* | 12/2004 | McClellan .................. 380/262 |
| 2004/0252837 A1 | 12/2004 | Harvey et al. |
| 2004/0260945 A1 | 12/2004 | Raikar et al. |
| 2004/0264454 A1 | 12/2004 | Rajkumar et al. |
| 2005/0010670 A1* | 1/2005 | Greschler et al. ............. 709/227 |
| 2005/0015623 A1 | 1/2005 | Williams et al. |
| 2005/0037733 A1 | 2/2005 | Coleman et al. |
| 2005/0063380 A1* | 3/2005 | Kayalackakom et al. .... 370/389 |
| 2005/0141447 A1 | 6/2005 | Carlton et al. |
| 2005/0152305 A1* | 7/2005 | Ji et al. .................. 370/328 |
| 2005/0183143 A1 | 8/2005 | Anderholm et al. |
| 2005/0195753 A1 | 9/2005 | Chaskar et al. |
| 2005/0237182 A1 | 10/2005 | Wang |
| 2005/0254474 A1 | 11/2005 | Iyer et al. |
| 2005/0254661 A1 | 11/2005 | Castaneda et al. |
| 2005/0272445 A1 | 12/2005 | Zellner |
| 2006/0018480 A1* | 1/2006 | Kachi .................. 380/270 |
| 2006/0038677 A1 | 2/2006 | Diener et al. |
| 2006/0067526 A1* | 3/2006 | Faccin et al. .................. 380/46 |
| 2006/0099965 A1 | 5/2006 | Aaron |
| 2006/0129672 A1 | 6/2006 | Mayer |
| 2006/0143439 A1 | 6/2006 | Arumugam et al. |
| 2006/0150250 A1* | 7/2006 | Lee et al. ................ 726/23 |
| 2006/0153156 A1 | 7/2006 | Wentink et al. |
| 2006/0165073 A1* | 7/2006 | Gopinath et al. ............. 370/389 |
| 2006/0165078 A1 | 7/2006 | Gopinath et al. |
| 2006/0174342 A1* | 8/2006 | Zaheer et al. .................. 726/23 |
| 2006/0236363 A1 | 10/2006 | Heard et al. |
| 2006/0267731 A1 | 11/2006 | Chen |
| 2006/0294597 A1* | 12/2006 | Tang ................. 726/27 |
| 2007/0029386 A1 | 2/2007 | Jessup |
| 2007/0094741 A1 | 4/2007 | Lynn et al. |
| 2007/0140301 A1 | 6/2007 | Kailash et al. |
| 2007/0192870 A1 | 8/2007 | Lynn et al. |
| 2007/0240222 A1 | 10/2007 | Tuvell et al. |
| 2007/0274315 A1 | 11/2007 | Keith |
| 2007/0298720 A1 | 12/2007 | Wolman et al. |
| 2008/0043686 A1* | 2/2008 | Sperti et al. .................. 370/338 |
| 2008/0144493 A1 | 6/2008 | Yeh |
| 2008/0271151 A1 | 10/2008 | Blake et al. |
| 2008/0307487 A1 | 12/2008 | Choyi et al. |
| 2008/0313737 A1 | 12/2008 | Garg et al. |
| 2009/0165137 A1 | 6/2009 | Yoo et al. |
| 2010/0042565 A1 | 2/2010 | Akerman |
| 2010/0074112 A1 | 3/2010 | Derr et al. |

FOREIGN PATENT DOCUMENTS

| | | |
|---|---|---|
| WO | WO 9859428 A1 | 12/1998 |
| WO | WO 01/43467 A1 | 6/2001 |
| WO | WO 0143467 A1 | 6/2001 |
| WO | WO 01/99031 A2 | 12/2001 |
| WO | WO 02/058346 A2 | 7/2002 |
| WO | WO 02/058346 A3 | 7/2002 |
| WO | WO 02058346 A2 | 7/2002 |
| WO | WO 02/097560 A2 | 12/2002 |
| WO | WO 02097560 A2 | 12/2002 |
| WO | WO 03/021851 | 3/2003 |
| WO | WO 03021851 A2 | 3/2003 |
| WO | WO 03/079708 A1 | 9/2003 |
| WO | WO 03079708 A1 | 9/2003 |
| WO | WO 03/084255 A1 | 10/2003 |

| | | |
|---|---|---|
| WO | WO 03/085544 A1 | 10/2003 |
| WO | WO 03/088547 A2 | 10/2003 |
| WO | WO 03/088687 | 10/2003 |
| WO | WO 03084255 A1 | 10/2003 |
| WO | WO 03085544 A1 | 10/2003 |
| WO | WO 03088547 A2 | 10/2003 |
| WO | WO 03088687 A1 | 10/2003 |
| WO | WO 2007038517 A1 | 4/2007 |

OTHER PUBLICATIONS

Berghel et al., WiFi Attack Vectors, Aug. 2005, Communications of the ACM Spyware, vol. 48 Issue 8, pp. 21-28.*

*IBM unlocks wireless security services*, IT World.Com (Date Alleged: Oct. 9, 2001) http://www.itworld.com/Net/2629/IDGO11009IBMsecurity (Accessed from Google's cache: Apr. 10, 2003.

*IBM Research's Wireless Security Auditor One-Step Ahead of Hackers*, MOBILEINFO.com, Issue 2001-30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM Debuts First Self-Diagnostic Wireless Security Tool on Linux*, LWN.Net, (Date Alleged: Jun. 17, 2002) http://www.lwn.net/Articles/2661 (Accessed: Apr. 10, 2003).

Losi, Stephanie, *IBM Steps Up Wireless Security*, Newsfactor Network (Date Alleged: Oct. 8, 2001) http://www.newsfactor.com/perl/story/14012.html (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

Schwartz, Ephraim, *IBM Offers a Peek at Self-Healing PCS: Autonomic computing initiative will lead to self-configuring desktops and notebooks and greater wireless security*. (Date Alleged: Nov. 19, 2002) http://www.pcworld.com/resource/printable/article/0,aid,107069.asp (Accessed from Google's cache: Apr. 10, 2003).

*IBM initiative addressed wireless security*, M2 Preswire (Date alleged: Oct. 9, 2001) http://www.lexis.com/research (Accessed: Apr. 10, 2003).

Manecksha, Ferina, *IBM to focus on "Think" strategy*, News Straits Times-Management Times (Date Alleged: Jan. 30, 2003) http://www.lexis.com/research (Accessed: Apr. 10, 2003).

Schwartz, Ephraim, IBM unveils autonomic computing on notebooks, desktops, Inforworld Daily News (Dated Alleged: Nov. 19, 2002) http://www.lexis.com/research (Accessed: Apr. 10, 2003).

Toomgum, Sirvish, *"Think" Big Blue, Nation*, Worldsources, Inc. (Date Alleged: Nov. 19, 2002) http://www.lexis.com/research (Accessed: Apr. 10, 2003).

Morochove, Richard, *Why Dell lets competitors do the heavy lifting*, Toronto Star (Date Alleged: Nov. 11, 2002) http://www.lexis.com/research (Accessed: Apr. 10, 2003).

*Wireless Security Auditor (WSA)*, IBM Security Research http://www.research.ibm.com/gsal/wsa/ (Accessed: Apr. 10, 2003).

*Distributed Wireless Security Auditor*, IBM Research http://www.research.ibm.com/gsal/dwsa/ (Accessed: Apr. 10, 2003).

*WhereLAN Location Sensor Locating Access Point*, Wherenet U.S.A. (2002).

Article entitled "A Short Tutorial on Wireless LANs and IEEE 802.11" by Lough et al., printed on May 27, 2002 in *The IEEE Computer Society's Student Newsletter*, Summer 1997, vol. 5, No. 2.

Non Final Office Action mailed on Apr. 14, 2010 in related U.S. Appl. No. 11/711,371, filed Feb. 27, 2007.

Final Office Action mailed on Oct. 7, 2010 in related U.S. Appl. No. 11/711,371, filed Feb. 27, 2007.

Non Final Office Action mailed on Nov. 10, 2011 in related U.S. Appl. No. 11/711,371, filed Feb. 27, 2007.

Non Final Office Action mailed on Feb. 20, 2009 in related U.S. Appl. No. 11/342,021, filed Jan. 27, 2006.

Final Office Action mailed on Sep. 21, 2009 in related U.S. Appl. No. 11/342,021, filed Jan. 27, 2006.

AiroPeek AiroPeek NX; Version 2.0.2 Technical Specifications; Wildpackets; www.wildpackels.com; 2003.

Non Final Office Action mailed on Jan. 25, 2010 in related U.S. Appl. No. 11/342,021, filed Jan. 27, 2006.

Non Final Office Action mailed on Jul. 9, 2010 in related U.S. Appl. No. 11/342,021, filed Jan. 27, 2006.

Final Office Action mailed on Dec. 23, 2010 in related U.S. Appl. No. 11/342,021, filed Jan. 27, 2006.

Distributed Wireless Security Auditor IBM Research http:www.research.ibm.comgsaldwsa (Accessed: Apr. 10 2003).

IBM Debuts First Self-Diagnostic Wireless Security Tool on Linux LWN.Net (Date Alleged: Jun. 17, 2002) http:www.lwn.netArticles2661 (Accessed: Apr. 10, 2003).

IBM extends its Wireless Security Auditor with more autonomic features Serverworld: Online News (Date Alleged: Jun. 2002) http:www.serverworldmagazine.comnewsflash220020619 ibmdwsa.shtml (Accessed: Apr. 10, 2003).

IBM initiative addresses wireless security M2 Preswire (Date alleged: Oct. 9, 2001) http:www.lexis.comresearch (Accessed: Apr. 10, 2003).

IBM Research's Wireless Security Auditor One-Step Ahead of Hackers Mobileinfo.com Issue 2001-30 (Date Alleged: Jul. 2001) (Alleged Update: Jul. 25, 2001) http:www.mobileinfo.comNews_2001Issue30IBM_Auditor.htm (Accessed from Google's cache: Apr. 10, 2003).

IBM unlocks wireless security services IT World.com (Date Alleged: Oct. 9, 2001) http:www.itworld.comNet2629IDGO11009IBMsecurity (Accessed from Google's cache: Apr. 10, 2003.

Losi Stephanie IBM Steps Up Wireless Security Newsfactor Network (Date Alleged: Oct. 8, 2001) http: www.newsfactor.comperlstory14012.html (Accessed: Apr. 10, 2003).

Lough Daniel et al. "A Short Tutorial on Wireless LANs and IEEE 802.11" printed on May 27, 2002 in The IEEE Computer Society's Student Newsletter. Summer 1997 vol. 5 No. 2.

Manecksha Ferina IBM to focus on "Think" strategy News Straits Times-Management Times (Date Alleged: Jan. 30, 2003) http:www.lexis.comresearch (Accessed: Apr. 10, 2003).

Morochove Richard Why Dell lets competitors do the heavy lifting Toronto Star (Date Alleged: Nov. 11, 2002) http:www.lexis.comresearch (Accessed: Apr. 10, 2003).

Schwartz Ephraim IBM Offers a Peek at Self-Healing PCS: Autonomic computing initiative will lead to self-configuring desktops and notebooks and greater wireless security. (Date Alleged: Nov. 19, 2002) http:www.pcworld.eomresourceprintablearticle0aid107069.asp (Accessed from Google's cache: Apr. 10, 2003).

Schwartz Ephraim IBM unveils autonomic computing on notebooks desktops Inforworld Daily News (Dated Alleged: Nov. 19, 2002) http:www.lexis.comresearch (Accessed: Apr. 10, 2003).

Toomgum Sirvish "Think" Big Blue Nation Worldsources Inc. (Date Alleged: Nov. 19, 2002) http: www.lexis.comresearch (Accessed: Apr. 10, 2003).

WhereLAN Location Sensor Locating Access Point Wherenet U.S. A. (2002).

Wireless Security Auditor (WSA) IBM Security Research http:www.research.ibm.comgsalwsa(Accessed: Apr. 10, 2003).

Non Final Office Action mailed on Mar. 10, 2009 in related U.S. Appl. No. 11/253,316, filed Oct. 19, 2005.

Wild Packets, "AiroPeek Technical Specifications", Apr. 2004. Available at http://web.archive.org/web/20040405092711/www.wildpackets.com/elements/AiroPeek_TechSpecs.pdf. Download Aug. 28, 2009.

Non Final Office Action mailed on May 18, 2010 in related U.S. Appl. No. 11/253,316, filed Oct. 19, 2005.

Final Office Action mailed on Nov. 10, 2010 in related U.S. Appl. No. 11/253,316, filed Oct. 19, 2005.

Anne Saita, "Hot Pick: AirDefense", Information Security, Jul. 2002. Available at http://www.airdefense.net/newsandpress/InfoSecMag.pdf. Downloaded Apr. 21, 2011.

Non Final Office Action mailed on Apr. 29, 2011 in related U.S. Appl. No. 11/253,316, filed Oct. 19, 2005.

Non Final Office Action mailed on Nov. 10, 2011 in related U.S. Appl. No. 11/253,316, filed Oct. 19, 2005.

Non Final Office Action mailed on Jul. 30, 2009 in related U.S. Appl. No. 11/464,043, filed Aug. 11, 2006.

Final Office Action mailed on Mar. 18, 2010 in related U.S. Appl. No. 11/464,043, filed Aug. 11, 2006.
Office Action mailed on Jun. 2, 2010 in related U.S. Appl. No. 11/464,043, filed Aug. 11, 2006.
Non Final Office Action mailed on Feb. 2, 2012 in related U.S. Appl. No. 11/464,043, filed Aug. 11, 2006.
Non Final Office Action mailed on Oct. 29, 2008 in related U.S. Appl. No. 11/332,065, filed Jan. 13, 2006.
Final Office Action mailed on Mar. 19, 2009 in related U.S. Appl. No. 11/332,065, filed Jan. 13, 2006.
Non Final Office Action mailed on Aug. 21, 2009 in related U.S. Appl. No. 11/332,065, filed Jan. 13, 2006.
Notice of allowance mailed on Jan. 12, 2010 in related U.S. Appl. No. 11/332,065, filed Jan. 13, 2006.
Non Final Office Action mailed on Sep. 17, 2010 in related U.S. Appl. No. 11/276,930, filed Mar. 17, 2006.
Final Office Action mailed on Mar. 21, 2011 in related U.S. Appl. No. 11/276,930, filed Mar. 17, 2006.
Marianantoni et al., Demo Abstract: Sensor Networks for Media Production, Nov. 3-5, 2004, ACM 1-58113-879-2/04/0011; p. 325.
Non Final Office Action mailed on Aug. 24, 2009 in related U.S. Appl. No. 11/382,590, filed May 10, 2006.
Final Office Action mailed on Feb. 19, 2010 in related U.S. Appl. No. 11/382,590, filed May 10, 2006.
Non Final Office Action mailed on Jul. 21, 2010 in related U.S. Appl. No. 11/382,590, filed May 10, 2006.
Final Office Action mailed on Jan. 24, 2011 in related U.S. Appl. No. 11/382,590, filed May 10, 2006.
Non Final Office Action mailed on May 28, 2010 in related U.S. Appl. No. 11/424,628, filed Jun. 16, 2006.
Final Office Action mailed on Dec. 9, 2010 in related U.S. Appl. No. 11/424,628, filed Jun. 16, 2006.
Notice of allowance mailed on Mar. 4, 2011 in related U.S. Appl. No. 11/424,628, filed Jun. 16, 2006.
Non Final Office Action mailed on Oct. 19, 2009 in related U.S. Appl. No. 11/603,814, filed Nov. 22, 2006.
Notice of allowance mailed on May 10, 2010 in related U.S. Appl. No. 11/603,814, filed Nov. 22, 2006.
Examiner's First Examination Report mailed on Jun. 19, 2008 in related counterpart Australian Patent Application No. 2003241523.
Non Final Office Action mailed on Sep. 23, 2009 in related U.S. Appl. No. 12/108,429, filed Apr. 23, 2008.
Non Final Office Action mailed on Apr. 5, 2010 in related U.S. Appl. No. 12/108,429, filed Apr. 23, 2008.
Final Office Action mailed on Sep. 17, 2010 in related U.S. Appl. No. 12/108,429, filed Apr. 23, 2008.
Non Final Office Action mailed on Dec. 2, 2010 in related U.S. Appl. No. 12/108,429, filed Apr. 23, 2008.
Joe Bardewell; WildPackets, Inc.; XP-002406414 "Assessing Wireless Securily with AiroPeek"; WildPackets; Copyright © 2001 WildPackets, Inc.
Herve Debar, Marc Daceir, Andreas Wespi; "Towards a Taxonomy of Intrusion-Detection Systems";.Computer Networks; IBM Research Division; Zurich Research Laboratory, Switzerland; © 1999 Elsevier Science BV All rights reserved.
Final Office Action mailed on May 9, 2011 in related U.S. Appl. No. 12/108,429, filed Apr. 23, 2008.
Notice of allowance mailed on Aug. 8, 2011 in related U.S. Appl. No. 12/108,429, filed Apr. 23, 2008.
Office Action mailed on Aug. 2, 2010 in related counterpart Canadian Patent Application No. 2486519.
Office Action mailed on Jun. 1, 2011 in related counterpart Canadian Patent Application No. 2486519.
Caberera et al., "Statistical traffic modeling for network intrusion detection" Modeling, Analysis and Simulation of Computer and Telecommunication Systems, 2000, Proceedings. 8th International Symposium on , vol., No., pp. 466-473, 2000.
Supplementary Partial European Search Report mailed on Dec. 22, 2010 in related counterpart European Patent Application No. 03731262.

Bardwell J: Asess1ng w1re1ess Security with AirPeek, Internet Citation , Jan. 13, 2002, XP002406414, Retrieved from the Internet: URL:http://www.packetnexus.com/docs/AiroPeek_Secur1ty.pdf [retrieved on Nov. 9, 2006].
First Examination Report mailed on Sep. 20, 2011 in related counterpart Indian Patent Application No. 3644/ DELNP/2004.
Non Final Office Action mailed on Feb. 14, 2007 in related U.S. Appl. No. 10/774,034, filed Feb. 6, 2004.
Final Office Action mailed on Aug. 7, 2007 in related U.S. Appl. No. 10/774,034, filed Feb. 6, 2004.
Non Final Office Action mailed on Oct. 31, 2007 in related U.S. Appl. No. 10/774,034, filed Feb. 6, 2004.
Final Office Action mailed on Apr. 9, 2008 in related U.S. Appl. No. 10/774,034, filed Feb. 6, 2004.
Non Final Office Action mailed on Jul. 1, 2008 in related U.S. Appl. No. 10/774,034, filed Feb. 6, 2004.
Final Office Action mailed on Nov. 20, 2008 in related U.S. Appl. No. 10/774,034, filed Feb. 6, 2004.
Notice of allowance mailed on Feb. 6, 2009 in related U.S. Appl. No. 10/774,034, filed Feb. 6, 2004.
IBM initiative addresses wireless security, IBM News (Date Alleged: Oct. 8, 2001) http://www.bim.com/news/us2001/10/08.html (Accessed from google's cache: Apr. 10, 2003).
Non Final Office Action mailed on Jan. 26, 2005 in related U.S. Appl. No. 10/160,904, filed Jun. 3, 2002.
Final Office Action mailed on Jul. 13, 2005 in related U.S. Appl. No. 10/160,904, filed Jun. 3, 2002.
Non Final Office Action mailed on Apr. 7, 2006 in related U.S. Appl. No. 10/160,904, filed Jun. 3, 2002.
Notice of allowance mailed on Oct. 16, 2006 in related U.S. Appl. No. 10/160,904, filed Jun. 3, 2002.
Ye et al, Information Fusion Techniques for Network Intrusion Detection, 1998, IEEE, pp. 117-120.
Fratto, Mike, Integrated Security Suites, Dec. 2000, Network Computing, pp. 85-87.
Fan et al, Using Artificial Anomalies to Detect Unknown and Known Network Intrusions, 2001 , IEEE, pp. 123-130.
Yang et al, Artificial Immune Theory Based Network Intrusion Detection System and the Algorithms Design, 2002, IEEE, pp. 7377.
Non Final Office Action mailed on Feb. 11, 2004 in related U.S. Appl. No. 10/161,137, filed Jun. 3, 2002.
Final Office Action mailed on Mar. 9, 2005 in related U.S. Appl. No. 10/161,137, filed Jun. 3, 2002.
Non Final Office Action mailed on Sep. 7, 2005 in related U.S. Appl. No. 10/161,137, filed Jun. 3, 2002.
Non Final Office Action mailed on Apr. 20, 2006 in related U.S. Appl. No. 10/161,137, filed Jun. 3, 2002.
Final Office Action mailed on Dec. 28, 2006 in related U.S. Appl. No. 10/161,137, filed Jun. 3, 2002.
Non Final Office Action mailed on Aug. 14, 2007 in related U.S. Appl. No. 10/161,137, filed Jun. 3, 2002.
Non Final Office Action mailed on Dec. 26, 2007 in related U.S. Appl. No. 10/161,137, filed Jun. 3, 2002.
Notice of allowance mailed on Feb. 15, 2008 in related U.S. Appl. No. 10/161,137, filed Jun. 3, 2002.
Non Final Office Action mailed on Sep. 30, 2004 in related U.S. Appl. No. 10/161,142, filed Jun. 3, 2002.
Non Final Office Action mailed on Dec. 6, 2005 in related U.S. Appl. No. 10/161,142, filed Jun. 3, 2002.
Notice of allowance mailed on Mar. 13, 2006 in related U.S. Appl. No. 10/161,142, filed Jun. 3, 2002.
Notice of allowance mailed on May 23, 2006 in related U.S. Appl. No. 10/161,142, filed Jun. 3, 2002.
Non Final Office Action mailed on Sep. 8, 2004 in related U.S. Appl. No. 10/161,440, filed Jun. 3, 2002.
Non Final Office Action mailed on Apr. 6, 2005 in related U.S. Appl. No. 10/161,440, filed Jun. 3, 2002.
Notice of allowance mailed on Nov. 8, 2005 in related U.S. Appl. No. 10/161,440, filed Jun. 3, 2002.
Notice of allowance mailed on Dec. 15, 2005 in related U.S. Appl. No. 10/161,440, filed Jun. 3, 2002.
Notice of allowance mailed on Dec. 12, 2005 in related U.S. Appl. No. 10/161,440, filed Jun. 3, 2002.

Notice of allowance mailed on Dec. 28, 2005 in related U.S. Appl. No. 10/161,440, filed Jun. 3, 2002.
Non Final Office Action mailed on Aug. 7, 2008 in related U.S. Appl. No. 11/370,611, filed Mar. 8, 2006.
Notice of allowance mailed on Jan. 12, 2009 in related U.S. Appl. No. 11/370,611, filed Mar. 8, 2006.
Namboodiri et al, Alert: An Adaptive Low-Latency Event-Driven MAC Protocol for Wireless Sensor Networks, 2008, IEEE, pp. 159-170.
Nakamura et al, Information Fusion for Wireless Sensor Networks: Methods, Models, and Classifications, 2007, ACM, pp. 1-55.
Li et al, A Distributed Intrusion Detection Scheme for Wireless Sensor Networks, 2008, IEEE, pp. 309-314.
Li et al, A Group-Based Intrusion Detection Scheme in Wireless Sensor Networks, 2008, IEEE, pp. 286-291.
Non Final Office Action mailed on Oct. 2, 2008 in related U.S. Appl. No. 11/382,218, filed May 8, 2006.
Final Office Action mailed on Apr. 2, 2009 in related U.S. Appl. No. 11/382,218, filed May 8, 2006.
Non Final Office Action mailed on Sep. 2, 2009 in related U.S. Appl. No. 11/382,218, filed May 8, 2006.
Final Office Action mailed on Mar. 26, 2010 in related U.S. Appl. No. 11/382,218, filed May 8, 2006.
Non Final Office Action mailed on Sep. 23, 2009 in related U.S. Appl. No. 11/551,315, filed Oct. 20, 2006.
Notice of allowance mailed on Apr. 21, 2010 in related U.S. Appl. No. 11/551,315, filed Oct. 20, 2006.
Non Final Office Action mailed on Feb. 28, 2007 in related U.S. Appl. No. 11/551,315, filed Feb. 6, 2003.
Notice of allowance mailed on Jul. 16, 2007 in related U.S. Appl. No. 11/551,315, filed Feb. 6, 2003.
Non Final Office Action mailed on Mar. 2, 2007 in related U.S. Appl. No. 10/700,842, filed Nov. 4, 2003.
Final Office Action mailed on Sep. 19, 2007 in related U.S. Appl. No. 10/700,842, filed Nov. 4, 2003.
Notice of allowance mailed on Nov. 16, 2007 in related U.S. Appl. No. 10/700,842, filed Nov. 4, 2003.
Ex Parte Quayle Action mailed on Jan. 10, 2008 in related U.S. Appl. No. 10/700,844, filed Nov. 4, 2003.
Notice of allowance mailed on Feb. 12, 2008 in related U.S. Appl. No. 10/700,844, filed Nov. 4, 2003.
Non Final Office Action mailed on Oct. 5, 2005 in related U.S. Appl. No. 10/773,915, filed Feb. 6, 2004.
Final Office Action mailed on Apr. 5, 2006 in related U.S. Appl. No. 10/773,915, filed Feb. 6, 2004.
Non Final Office Action mailed on Oct. 6, 2006 in related U.S. Appl. No. 10/773,915, filed Feb. 6, 2004.
Notice of allowance Action mailed on Sep. 12, 2007 in related U.S. Appl. No. 10/773,915, filed Feb. 6, 2004.
Non Final Office Action mailed on Apr. 3, 2008 in related U.S. Appl. No. 10/774,111, filed Feb. 6, 2004.
Non Final Office Action mailed on Sep. 5, 2008 in related U.S. Appl. No. 10/774,111, filed Feb. 6, 2004.
Notice of allowance mailed on Dec. 11, 2008 in related U.S. Appl. No. 10/774,111, filed Feb. 6, 2004.
Non Final Office Action mailed on Aug. 10, 2007 in related U.S. Appl. No. 10/700,914, filed Nov. 4, 2003.
Final Office Action mailed on Mar. 17, 2008 in related U.S. Appl. No. 10/700,914, filed Nov. 4, 2003.
Non Final Office Action mailed on Aug. 20, 2008 in related U.S. Appl.No. 10/700,914, filed Nov. 4, 2003.
Non Final Office Action mailed on Jul. 30, 2009 in related U.S. Appl. No. 10/700,914, filed Nov. 4, 2003.
Final Office Action mailed on Jan. 28, 2010 in related U.S. Appl. No. 10/700,914, filed Nov. 4, 2003.
Non Final Office Action mailed on Jun. 16, 2010 in related U.S. Appl. No. 10/700,914, filed Nov. 4, 2003.
International Search Report mailed on Feb. 26, 2004 in related counterpart International Application No. PCT/US03/15844.
International Search Report mailed on Oct. 2, 2007 in related counterpart International Application No. PCT/US04/12227.
International Preliminary Report on Patentability dated Jun. 17, 2008 in related counterpart International Application No. PCT/US04/12227.
Hsin et al., A distributed monitoring mechanism for wireless sensor networks, Sep. 2002, ACM, 1-58113-585.

\* cited by examiner

| Type | Attack | Tools |
|---|---|---|
| Reconnaissance | Rogue APs<br>Open/Misconfigured APs<br>Ad Hoc stations | Netstumbler, Kismet, Wellenrighter |
| Sniffing | WEP, WPA, LEAP crack<br>Dictionary attacks<br>Leaky APs | AirSnort, Cain, Wepcrack, Cowpatty, Ettercap |
| Masquerade | MAC spoofing<br>AirSnarf/HotSpot attacks<br>Evil Twin/Wi-Phishing | AirSnarf, Hotspotter, HostAP, SMAC |
| Insertion | Multicast/Broadcast<br>Routing cache poisoning<br>Man in the Middle attack | Airpwn, Irpass, WepWedgie, ChopChop, Vippr |
| DoS | Disassociation<br>Duration field spoofing<br>RF jamming | AirJack, void11, Bugtraq, IKE-crack |

FIG. 1

| WEP | WPA |
|---|---|
| 40-bit keys / 128-bit keys | 128-bit keys |
| Static | Dynamic session keys |
| Manual key distribution | Automatic key distribution |
| Uses WEP itself for authentication | 802.1X and EAP authentication |

METHODS AND SYSTEMS FOR WIRED EQUIVALENT PRIVACY AND WI-FI PROTECTED ACCESS PROTECTION

CROSS-REFERENCE TO RELATED APPLICATIONS

This application incorporates by this reference in their entirety for all purposes commonly assigned U.S. patent applications filed Jun. 2, 2002:

| Application No. | Title |
| --- | --- |
| 10/161,142 | "SYSTEMS AND METHODS FOR NETWORK SECURITY" |
| 10/161,440 | "SYSTEM AND METHOD FOR WIRELESS LAN DYNAMIC CHANNEL CHANGE WITH HONEYPOT TRAP" |
| 10/161,443 | "METHOD AND SYSTEM FOR ACTIVELY DEFENDING A WIRELESS LAN AGAINST ATTACKS" |
| 10/160,904 | "METHODS AND SYSTEMS FOR IDENTIFYING NODES AND MAPPING THEIR LOCATIONS" |
| 10/161,137 | "METHOD AND SYSTEM FOR ENCRYPTED NETWORK MANAGEMENT AND INTRUSION DETECTION" |

Furthermore, this application incorporates by reference for all purposes, commonly assigned U.S. patent applications filed Nov. 4, 2003:

| Application No. | Title |
| --- | --- |
| 10/700,842 | "SYSTEMS AND METHODS FOR AUTOMATED NETWORK POLICY EXCEPTION DETECTION AND CORRECTION" |
| 10/700,914 | "SYSTEMS AND METHOD FOR DETERMINING WIRELESS NETWORK TOPOLOGY" |
| 10/700,844 | "SYSTEMS AND METHODS FOR ADAPTIVELY SCANNING FOR WIRELESS COMMUNICATIONS" |

Furthermore, this application incorporates by reference for all purposes, commonly assigned U.S. patent applications filed Feb. 6, 2004:

| Application No. | Title |
| --- | --- |
| 10/774,034 | "SYSTEMS AND METHODS FOR ADAPTIVE LOCATION TRACKING" |
| 10/774,111 | "WIRELESS NETWORK SURVEY SYSTEMS AND METHODS" |
| 10/774,896 | "SYSTEMS AND METHODS FOR ADAPTIVE MONITORING WITH BANDWIDTH CONSTRAINTS" |
| 10/774,915 | "DYNAMIC SENSOR DISCOVERY AND SELECTION SYSTEMS AND METHODS" |

Furthermore, this application incorporates by reference for all purposes, commonly assigned U.S. patent applications filed Oct. 19, 2005:

| Application No. | Title |
| --- | --- |
| 11/253,316 | "PERSONAL WIRELESS MONITORING AGENT" |

Furthermore, this application incorporates by reference for all purposes, commonly assigned U.S. patent applications filed Jan. 13, 2006:

| Application No. | Title |
| --- | --- |
| 11/332,065 | "SYSTEMS AND METHODS FOR WIRELESS INTRUSION DETECTION USING SPECTRAL ANALYSIS" |

Furthermore, this application incorporates by reference for all purposes, commonly assigned U.S. patent applications filed Mar. 17, 2006:

| Application No. | Title |
| --- | --- |
| 11/276,925 | "SYSTEMS AND METHODS FOR WIRELESS SECURITY USING DISTRIBUTED COLLABORATION OF WIRELESS CLIENTS" |
| 11/276,930 | "SYSTEMS AND METHODS FOR WIRELESS NETWORK FORENSICS" |

This application also incorporates by reference for all purposes, commonly assigned U.S. patent application filed May 10, 2006:

| Application No. | Title |
| --- | --- |
| 11/382,590 | "RFID INTRUSION PROTECTION SYSTEM AND METHODS" |

This application also incorporates by reference for all purposes, commonly assigned U.S. patent application filed Jun. 16, 2006:

| Application No. | Title |
| --- | --- |
| 11/424,628 | "SYSTEMS AND METHODS FOR WIRELESS CONTENT FILTERING" |

BACKGROUND AND SUMMARY

This disclosure relates to wireless network protection systems and methods, and more particularly to systems and methods for disrupting the breaking of encryption for wired equivalent privacy (WEP) and the breaking of authentication for Wi-Fi protected access (WPA) protection filtering and systems and method for disrupting reconnaissance, denial-of-service (DOS), insertion, and masquerade attacks.

Wireless networks, also known as Wireless Local Area Networks (WLANs), offer a quick and effective extension of a wired network or a standard local area network (LAN). Wireless networks can achieve transmission rates close to that of wired networks such as 11 Mb/s and 54 Mb/s. As such, users can execute many of the same network applications using wireless networks that can be executed using wired networks.

Wireless networks can include nodes such as wireless access points (APs) and wireless client devices. Wireless AP devices can be connected wirelessly to form a wireless network. The AP can also connect to a wired network, and can relay data between wireless devices and wired devices. Wireless client devices can include laptop and desktop computers, and other devices capable of networked communication that are equipped with wireless capability. Nodes can communicate to another node or broadcast on the wireless network.

Wireless networks operated based on standards such as the Institute of Electrical and Electronics Engineers (IEEE) 802.11 family of protocols, which are hereby incorporated by reference. The IEEE 802.11 standard was designed with ease of use in mind. In fact, the original 802.11 standard allowed open authentication and clear text transmissions. The goal was to minimize infrastructure and complicated setups for a friendly, instant-connectivity wireless network. WLAN adoption occurred rapidly. Even important business networks have started using WLAN technology.

However, this has spurred interest within the hacker community to exploit a deployed standard with weak default security. This interest has lead to a proliferation of easy to use tools that can wreak havoc on these networks.

In turn, there has been a counter attempt to provide encryption for data being passed on a wireless network. For example, WEP and WPA are widely deployed on current WLAN systems. However, both WEP and WPA are susceptible to attacks. WEP can be cracked by sniffing frames from the WLAN and using brute force or mathematical algorithms to break the key. WPA can be monitored by hackers who have acquired credentials to monitor WPA-enterprise traffic.

Emerging encryption standards are not all backwards compatible with existing WLAN deployments. Therefore, methods and systems are needed to protect existing WEP and WPA WLAN deployments. Such methods and systems can allow existing WLAN deployments to increase the useful lifespan of WEP and WPA deployments.

This disclosure relates to systems and methods for proactively defending wireless networks from attempts to break encryption or authentication and from attacks such as reconnaissance, sniffing, denial-of-service, and masquerade attacks. Systems and methods can utilize wireless devices in a wireless network to transmit random Wired equivalent privacy (WEP) frames, thereby confusing rogue devices trying to capture encrypted packets in an attempt to break encryption. Such systems and methods can also transmit random challenge-response frames to thwart attacks against authentication. Still further systems and methods can utilize wireless devices in the network to transmit random probe responses in response to a reconnaissance attack, and to inject noise through frames transmitted during denial-of-service, insertion, and masquerade attacks. Systems and methods for protecting wireless networks can be implemented in a distributed wireless intrusion prevention system or in a stand alone monitoring device.

Methods of preventing an attempt to break encryption or authentication of a wireless network can include: monitoring the wireless network; and, transmitting random wired equivalent privacy encrypted frames on the wireless network responsive to a condition in the monitoring step, the random wired equivalent privacy encrypted frames are operable to confuse monitoring devices attempting to capture wired equivalent privacy encrypted frames to break the wired equivalent privacy key.

Methods of thwarting an attack against authentication on a Wi-Fi protected access wireless network can include: monitoring the wireless network; and, transmitting random challenge-response frames on the wireless network responsive to a condition in the monitoring step, the random challenge-response frames are operable to thwart attacks against authentication by forcing a rotation of the keys thereby preventing sniffing attacks by a rogue device.

Methods of using one or more wireless sensors as active transmitting devices to thwart a reconnaissance attack can include: monitoring the wireless network, the monitoring is performed by any of wireless sensors, wireless access points, wireless client devices configured with a software agent, and combinations thereof; and, transmitting random probe requests in response to active reconnaissance probe requests, the random probe requests are operable to thwart a rogue device from performing the reconnaissance attack.

Methods of using one or more wireless sensors to disrupt denial-of-service, insertion, and masquerade attacks include: monitoring the wireless network, the monitoring is performed by any of wireless sensors, wireless access points, wireless client devices configured with a software agent, and combinations thereof; and, transmitting random probe requests in response to an unauthorized frame transmission, the random probe request is operable to create errors in the unauthorized frame transmission such that a device discards the unauthorized frame transmission.

BRIEF DESCRIPTION OF THE DRAWINGS

This disclosure is illustrated and described herein with reference to the various drawings, in which like reference numbers denote like system components and/or method steps, as appropriate, and in which:

FIG. 1 depicts a table illustrating five broad categories of vulnerabilities present in IEEE 802.11 based wireless local area networks (WLANs) and examples of attack tools that can be used to exploit these vulnerabilities.

FIG. 3 is a table illustrating attributes of WEP and WPA encryption.

DETAILED DESCRIPTION

Figure 2:
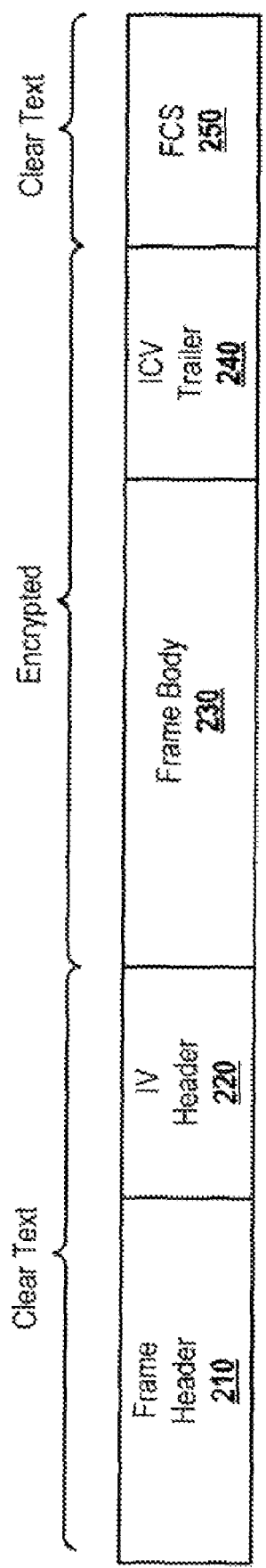
FIG. 2 is a block diagram of an encrypted 802.11 media access control (MAC) frame.

This disclosure relates to systems and methods for protecting wireless networks from attempts to break encryption or authentication and from attacks such as reconnaissance, sniffing, denial-of-service, and masquerade attacks. This disclosure utilizes wireless devices in a wireless network to transmit random wired equivalent privacy (WEP) frames to confuse rogue devices trying to capture encrypted packets to break encryption and to transmit random challenge-response frames to thwart attacks against authentication. Further, this disclosure utilizes wireless devices in the network to transmit random probe responses to protect the network from a reconnaissance attack, and to inject noise through frames transmitted during denial-of-service, insertion, and masquerade attacks. Methods for protecting wireless networks can be implemented in a distributed wireless intrusion prevention system or in a stand alone monitoring device.

FIG. 1 depicts a table illustrating five broad categories of vulnerabilities that exist in IEEE 802.11 based wireless local area networks (WLANs) and examples of attack tools used to exploit these vulnerabilities. The IEEE 802.11 standard that is currently used by WLANs was designed with ease of use in mind. The original IEEE 802.11 standard allowed open authentication and clear text transmissions, in order to minimize infrastructure and complicated setups for an easy, instant-connectivity wireless network. WLAN adoption occurred rapidly. Even important business networks have started using WLAN technology. Business use has generated interest within the hacker community to exploit deployed standards weak default security. In response, this had lead to a proliferation of easy to use tools that can exploit these networks.

A reconnaissance attack exploits advertisements to identify WLANs. WLAN access points (APs) and stations broadcast their presence by default. APs send out beacon frames and relay information such as timestamp, service set identifier (SSID), supported rates, power save information, among others. Client stations may actively send out probe request frames to seek out other IEEE 802.11 devices available for association. Reconnaissance tools exploit these advertisements to identify wireless networks. Freeware tools available for Microsoft Windows (available from Microsoft, Inc. of Redmond, Wash.) such as NetStumbler (available from NetStumbler.com of San Diego, Calif.) scan the medium searching for APs that broadcast their SSIDs, providing easy ways for hackers to find open networks. More advanced tools, such as Kismet (available from http://www.kismetwireless.net), have been introduced to passively monitor and capture wireless traffic.

Both NetStumbler and Kismet can use Global Positioning System (GPS) information to map the exact locations of WLANs. Potential intruders, including those who gather information about WLANs, can use these tools to locate the physical presence of wireless networks and gather information about the wireless networks, regardless of whether they are secure or unsecured. This information can be posted on websites such as www.wigle.net (currently hosting a worldwide database and mapping of 4,654,608 wireless networks) and http://www.wifinder.com. Hackers use these listings to look for location specific APs with matching SSIDs, MAC address, etc., to find out lucrative attack targets.

Sniffing occurs because IEEE 802.11 frames are visible to any device on the same channel and within range of the transmitting device. Moreover, hackers can use high gain antennas to connect with WLANs over a distance. These antennas can enable hackers to receive IEEE 802.11 signals from several thousand feet away, thereby gathering information about the network while remaining completely out of sight. The sniffed packets can be used to view unencrypted communications or to break encryption.

Tools such as Effetech (available from http://www.effetech.com), a HTTP packet sniffer, can be used to reassemble files sent over clear text wireless links. With encrypted frames, hackers use tools such as WEPCrack (available from http://sourceforge.net/projects/wepcrack) and AirSnort (available from http://airsnort.shmoo.com) to break the wired equivalent privacy (WEP) encryption standard based on the sniffed frames. These tools exploit vulnerabilities in the WEP encryption algorithm by passively observing WLAN traffic until they collect enough data to determine the encryption key. Once the static WEP key is compromised, the encrypted communication can be decrypted, and higher layer analysis tools such as Effetech can be used to obtain more information.

A masquerade attack steals an authorized user's identity on the wireless network. Even though SSIDs and MAC addresses act as personal identification variables for verifying the identity of authorized clients, knowledgeable hackers can pick off authorized SSIDs and MAC addresses and steal bandwidth, corrupt or download files, and compromise the entire network. Some enterprises secure their WLAN by using an authorized list of station MAC addresses for authentication (e.g., MAC filtering). However, even if the network is using encryption or Virtual Private Network (VPN), MAC addresses are being transmitted without encryption. With software tools such as Kismet or Ethereal (available from Ethereal, Inc. at http://www.ethereal.com), a hacker can capture the MAC address of a valid user. To perform identity theft, a hacker can change his MAC address to the victim's MAC address using a spoofing utility such as SMAC (Spoof MAC) (available from KLC Consulting, Inc. of Holden, Mass.), or, manually change the Windows registry entry. Once this has been done, the hacker bypasses any MAC address filtering, and can connect to the WLAN. There is also a misconception that identity theft is only feasible if the MAC address is used for authentication and that 802.1x based authentication schemes such as lightweight extensible anthentication protocol (LEAP) are totally safe. Cracking LEAP to steal identity has become easy with tools like ASLEAP (available from http://asleap.sourceforge.net/). Other authentication schemes, such as EAP-TLS and PEAP, can implicate more sophisticated attacks that exploit other known vulnerabilities in wired side authentication schemes.

Using a malicious association attack, a hacker can cause an unsuspecting user station to connect to a spoofed IEEE 802.11 network, or alter the configuration of the station to operate in an ad-hoc networking mode. To begin, the hacker can set up a laptop as a soft AP using freeware tools, such as HostAP (available from http://hostap.epitest.fi/) or AirSnark (available from http://tinfoilhat.shmoo.com/). As the victim's station broadcasts a request to associate with an AP, the hacker's soft AP responds to this request and establishes a connection between the two. Next, the soft AP can provide an IP address to the victim's user station. Once this is done, the hacker can scan the victim's station with tools designed to find Windows' vulnerabilities. The hacker can then steal information, install Trojan horses or other spyware, and if it is connected to the wired network, use the victim's station as a launch pad to get access to other servers. WLANs are subject to diversion. Stations do not always know which AP or network they are connecting to. Stations can be tricked or forced to connect to a malicious AP, since there is often no authentication of the AP. This is an open systems interconnection (OSI) reference model layer 2 (data link layer) vulnerability of WLANs. OSI Layer 3 (network layer) authentication offers no protection against layer 2 attacks, nor does the use of VPNs. WLANs with 802.1x based authentication (at layer 2) do help protect against malicious associations, but are still vulnerable. Malicious association attacks do not break the VPN or other security measures. Instead, malicious association attacks operate to hijack the client at OSI layer 2.

A rising trend of masquerade attacks involves "evil twin" and "wi-phishing" type of attacks. An evil twin is an AP offering a wireless connection to the Internet pretending to be a trusted wireless network. The unsuspecting user discovers the evil twin AP which looks similar to, or even identical to the legitimate public network the user logs on to every day. If the evil twin AP presents the user with a familiar scenario, such as a login page to a hotspot, the user might readily provide his or her username and password.

In addition to tricking an unsuspecting user into connecting to their laptop, hackers have the benefit of taking advantage of the increasingly wireless-friendly nature of the Windows XP operating system. Due to the self-deploying nature of wireless, a wireless laptop that is Wi-Fi enabled with continue to probe for APs it has been connected to in the past. These probes can be picked up in the air by freely available wireless monitoring tools. If the Wireless Connection Manager in Windows XP (available from Microsoft Corp. of Redmond, Wash.) sees a legitimate SSID it will automatically re-connect to that AP. All the hacker has to do is give his soft AP a detected SSID.

Wi-Phishing is the act of covertly setting up a wireless-enabled laptop or AP (such as an Evil Twin) but for the sole purpose of getting wireless laptops to associate and track keystrokes, allowing the hacker to capture passwords and credit card information. This concept is very similar to the email phishing scams, where a message is sent to users tricking them into entering confidential information, such as bank account information or other sensitive username and password combinations.

Insertion attacks exploit improperly configures WLANs or rogue APs to target the entire network. When an AP is attached to an unfiltered portion of the enterprise network, it broadcasts network traffic, such as spanning tree (802.1D), open shortest path first (OSPF), routing information protocol (RIP), hot standby routing protocol (HSRP) and other broadcast or multicast traffic. This invites attacks that can leave an entire WLAN wireless and wired network equipment vulnerable and spur a failure of the entire network including hubs, routers, and switches.

The spanning tree algorithm normally ensures a loop-free ethernet topology for networks that contain parallel bridges and multiple Ethernet segments. Loops occur when there are alternate routes between hosts. If a loop exists in an extended network, bridges may forward traffic to false or wrong ethernet hosts indefinitely, increasing traffic and declining network performance to the point where the network stops responding. A hacker can inject traffic onto the WLAN segment and it will be propagated through the entire enterprise. Spanning tree attacks usually render intelligent hubs, bridges, routers, and switches inoperative, requiring the devices to be rebooted or reconfigured to make them functional.

Routing is another vulnerability for enterprise attacks. A hacker can use tools such as IRPAS (available from http://www.phenoelit.de/irpas/) to inject bogus routing updates into the network, changing the default gateways or destroying routing tables. Any rogue AP on the network that is not filtered by a gateway leaves the network vulnerable to this type of attack.

One of the more sophisticated attacks, the Man-in-the-Middle attack can break VPN connections between authorized stations and APs by inserting a malicious station between the victim's station and the AP. Tools such as Wep-Wedgie (available from http://sourceforge.net/projects/wep-wedgie/) minimize the time needed to crack long WEP keys from days to hours by using a traffic injection technique to create large amounts of traffic for key recovery.

Denial-of-Service (DoS) attacks create downtime and loss of productivity in a WLAN. For a wireless network, DoS attacks can come from any direction. There are several readily-available freeware tools such as AirJack (available from http://sourceforge.net/projects/airjack/) that can launch DoS attacks. These tools use spoofed deauthentication of disassociation frames, spoofed duration fields, RF jamming, etc. DoS attacks can be directed against a specific user station to prevent that station from communicating with the network, against a specific AP to prevent stations from connecting with it, or as an attack against all network devices. In the latter case, the attack can effectively preclude all WLAN activity.

A rogue deice can abuse the extensible authentication protocol (EAP) to launch a DoS attack against the authentication server, flooding it with requests to be processes. This prevents valid users from authenticating to the WLAN, and causes a DoS across the entire enterprise. Additionally, this can result in an outage of the wired network.

The IEEE 802.11i standard was adopted to improve WLAN security. IEEE 802.11i uses port-based 802.1x authentication and advanced encryption standard (AES) encryption. IEEE 802.11i mechanisms improve the security of wireless networks, but they encounter difficulties with providing backwards compatibility, inclusion of legacy devices, universal enforcement of IEEE 802.11i policy on newer devices, and lack of management frame authentication. Additionally, many WLAN implementations continue to use legacy security techniques such as wired equivalent privacy (WEP) and wi-fi protected access (WPA and WPA2) which continue to be vulnerable to attacks.

FIG. 2 depicts a block diagram of the fields of an 802.11 encrypted frame format 200. IEEE 802.11 specifies a wired local area network (LAN) equivalent data confidentiality algorithm. Wired equivalent privacy (WEP) protects authorized users of a WLAN from casual eavesdropping. This service can provide functionality for the WLAN equivalent to the functionality provided by the physical security attributes inherent to a wired medium. It is generally difficult to determine the content of a wireless frame which is encrypted without the detection key.

To prevent monitoring of clear text transmissions, encryption techniques were developed such as WEP, WPA and WPA2. WEP is a scheme that is part of the IEEE 802.11 wireless networking standard to secure IEEE 802.11 wireless networks. Because a wireless network broadcasts messages using radio, it is particularly susceptible to eavesdropping. WEP was intended to provide comparable confidentiality to a traditional wired network (in particular it doesn't protect users of the network from each other), hence the name. Several serious weaknesses were identified by cryptanalysts, and WEP was superseded by WPA in 2003, and then by the full IEEE 802.11i standard (also known as WPA2) in 2004.

The IEEE 802.11 encrypted frame format 200 includes a frame header 210, an initialization vector (IV) header 220, a frame body 230, an integrity check value (ICV) trailer 240, and a frame check sequence (FCS) 250. The frame header 210 and the IV header 220 are transmitted in clear text, i.e. without encryption, on the WLAN. The ICV trailer 240 and frame body 230 are encrypted. A receiving station utilizes the IV header 220 and the ICV trailer 240 decrypt the transmission.

FIG. 3 illustrates attributes of WEP and WPA encryption. WEP is part of the IEEE 802.11, which is hereby incorporated by reference. Both WEP and WPA utilize keys to form the encryption. WEP uses a 40 bit key, which is concatenated to a 24-bit initialization vector (IV) to form the Rivest Cipher 4 (RC4) traffic key. At the time that the original WEP standard was being drafted, export restrictions on cryptographic technology limited the keysize. Once the restrictions were lifted, major manufacturers eventually implemented an extended 128-bit WEP protocol using a 104-bit key size. A 128-bit WEP key is typically entered statically as a string of 26 Hexadecimal characters. Each character represents 4 bits of the key which equals 4×26=104 bits. The 128-bit WEP key includes these 104 bits plus the 24-bit IV.

Key size is not the major security limitation in WEP. Both 64-bit and 128-bit WEP suffer from the weak implementation of the 24-bit Initialization Vector (IV). Cracking a longer key requires interception of more packets, but there are active attacks that simulate the necessary traffic. There are other weaknesses in WEP, including the possibility of IV collisions and altered packets that are not helped at all by a longer key.

The IV is a pre-shared key which is passed unencrypted with each encrypted packet. In particular, a 24-bit IV can be exhausted (i.e. all 16,777,216 possible combinations of the IV) on a busy network in approximately five hours. Hence, the IV can be reinitialized to zero at least once approximately every five hours. The weakness in WEP IV keys leads to network vulnerabilities such as active and passive attacks to decrypt traffic and dictionary attacks.

WEP cracking works by exploiting the weak randomization of the WEP encryption algorithm. Attackers exploit the fact that the WEP algorithm will re-use its IVs during a streaming cipher. Either during a passive monitoring (i.e. sniffing) or an active injection attack a potential intruder can derive all the possible IVs for the cipher and therefore derive the WEP key from there.

Wi-Fi protected access (WPA and WPA2) was created in response to several serious weaknesses researchers had found in WEP. WPA implements the majority of the IEEE 802.11i standard, and was intended as an intermediate measure to take the place of WEP while 802.11i was prepared. WPA is designed to work with all wireless network interface cards, but not necessarily with first generation wireless access points which use WEP. WPA2 implements the full standard, but may not work with older network cards. Both provide good security, with two significant issues: (1) either WPA or WPA2 must be enabled and chosen in preference to WEP. WEP is usually presented as the first security choice in most installation instructions, and (2) in the "Personal" mode, the most likely choice for homes and small offices, a passphrase is required that, for full security, must be longer than the typical 6 to 8 character passwords users are taught to employ.

WPA expands the IV to 48-bit which increases the possible combinations of the IV from 16,777,216 in WEP to over 500 trillion, significantly reducing the inherent weaknesses of a shorter IV key. Additionally, WPA uses a temporal key integrity protocol (TKIP) and message integrity code (MIC) to automatically distribute per-packet keys. This changes the encryption key for every frame and sets a unique default key for each client. Despite the improvements, WPA is still vulnerable to attacks such as "birthday attacks," denial-of-service (DoS) attacks, and "dictionary attacks" (if short).

This disclosure provides systems and methods for protecting the existing WEP and WPA encryption methods. For WEP protection, random traffic is simulated to override the inherent weak vulnerability built into the WEP encryption algorithm. By simulating truly random traffic, you can prevent attackers from acquiring enough data to brute force or mathematically attack the WEP encryption algorithm. The effort required for a hacker to break the WEP keys increases by simulating traffic that mimics valid data but increases the IV keyspace. The chaffing technique is the method of simulating valid packets that pass all validity checks but contain an IV that is different but logically correct and in sequence so that an attacker would be able to filter invalid packets. These false packets can cause enough of a jitter in the decryption routine to throw off cracking algorithm and make the decryption difficult.

For WPA protection, the encryption keys can be prematurely rotated. Alternatively, a bogus key can be exchanged. This causes an attacker to use invalid handshake variables which eliminates the possibility of the attacker deriving the keys and analyzing network traffic or injecting valid traffic into the streams. Here, fake handshakes can be simulated using the SNonce and ANonce transmissions during the four way handshake to throw off decryption programs such as Cowpatty (available from http://sourceforge.net/projects/cowpatty) and AirCrack (available from http://www.aircrack-ng.org). WPA and WPA2 also re-key in a given interval, so simulating a re-key periodically can throw off attackers listening into conversations.

Figure 4:
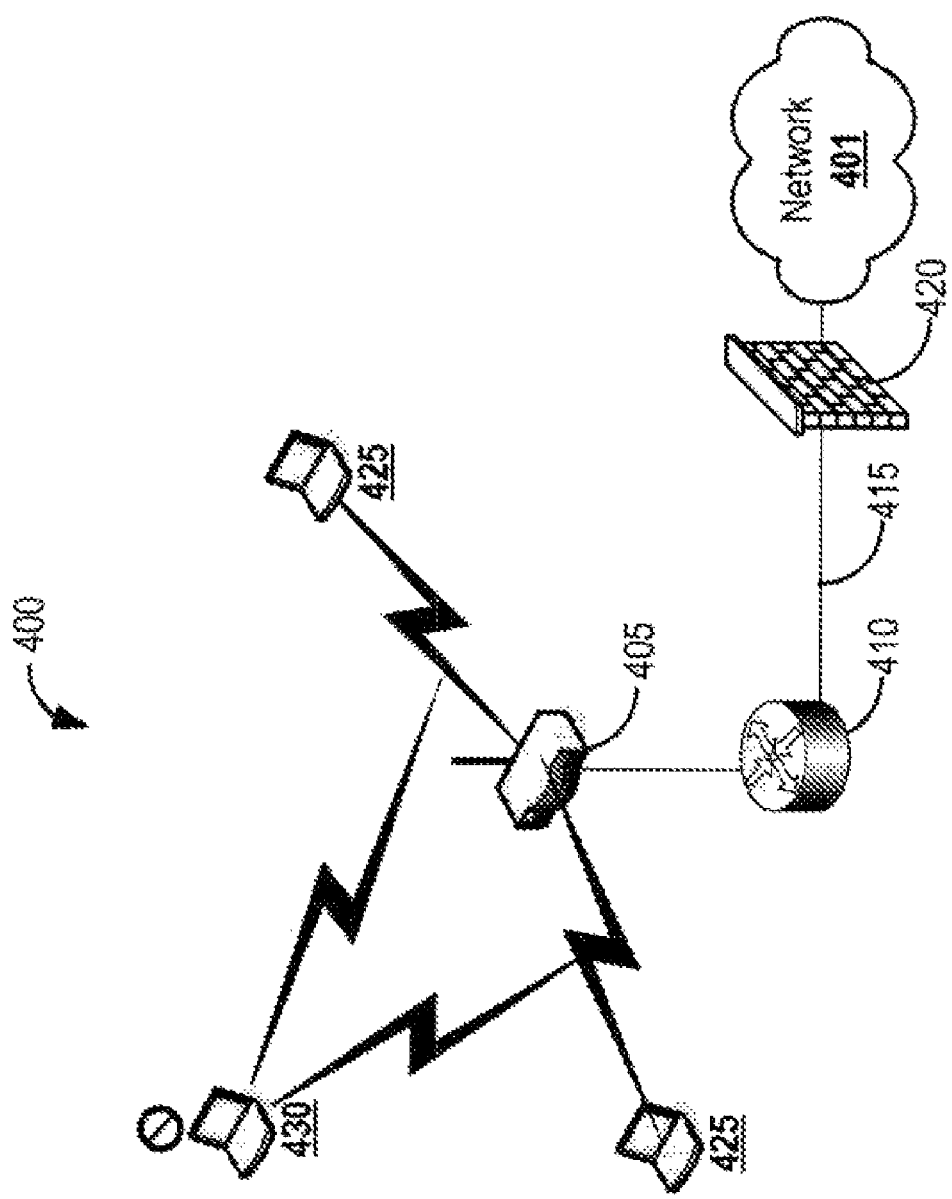
FIG. 4 is a block diagram an example of a wireless network with a rogue device capturing wireless transmissions.

FIG. 4 illustrates an exemplary embodiment of a wireless network 400 where a rogue device 430 is attempting to capture wireless transmissions. The wireless network 400 can include an access point (AP) 405 connected to a router 410 which connects to a network 401 and is protected by a firewall 420. Note, the wireless network 400 can be on either side of the firewall 420. The connection 415 between the AP 405, router 410, firewall 420, and network 401 can includes a local area network (LAN) such as an ethernet connection. The network 401 can include an internet protocol (IP) network. The wireless network 400 includes multiple wireless client devices 425 operable to connect to the AP 405 through a wireless link. Wireless client devices 425 can include laptop and desktop computers as well as other wireless-enable devices.

Because the wireless network 400 transmits over the air, a rogue device 430 can passively or actively monitoring the transmissions over the wireless link. Tools such as VPNMonitor (available from http://vpnmonitor.sourceforge.net/), HTTPDetect (available from EffeTech Sniffer at http://www.httpdetect.com/), MSN Sniffer (available from EffeTech Sniffer http://www.effetech.com/msn-sniffer/), and Ethereal (available from Ethereal, Inc. at http://www.ethereal.com/) are operable to monitor and store clear-text frames transmitted over the wireless network 400. If encryption such as WEP or WPA is used on the wireless network 400, then tools such as WinSniffer (available from WinSniffer, Inc. at http://www.winsniffer.com/), Ace Password (available from EffeTech Sniffer at http://www.effetech.com/aps/). Dsniff (available from http://www.monkey.org/-dugsong/dsniff/) and Cain (available from http://www.oxid.it/cain.html) can be used to capture authentication related information for breaking the encryption.

Figure 5B:
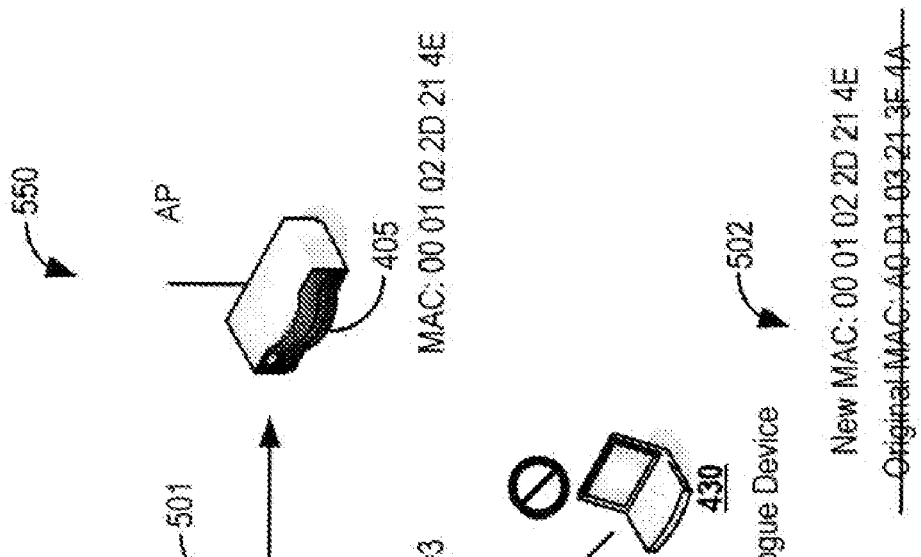
FIG. 5B is a block diagram showing an example implementation of a denial-of-service (DoS) attack.
Figure 5A:
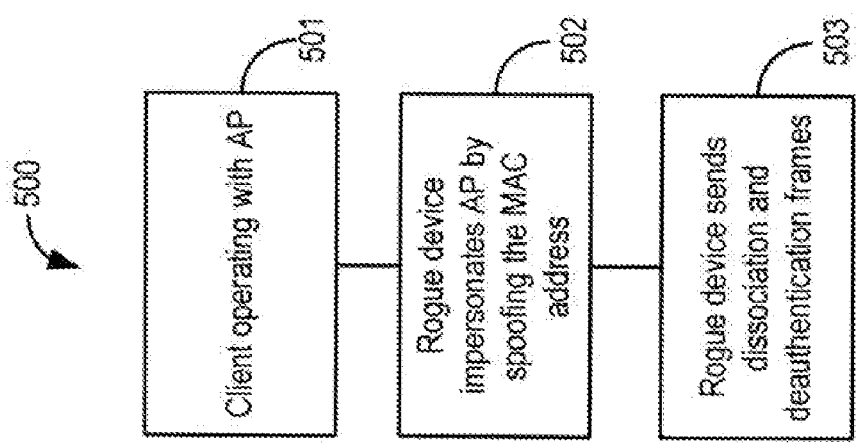
FIG. 5A is a flowchart showing an operational scenario associated with a denial-of-service (DoS) attack.

FIGS. 5A and 5B illustrate a flowchart 500 and a diagram 550 of an exemplary embodiment of a denial-of-service (DoS) attack. A client 425 is operating normally with an AP 405, as depicted in step 501. A rogue device 430 can impersonate the AP 405 by spoofing the MAC address of the AP 405, as depicted in step 502. The spoofing of the MAC address can be done as described in the masquerade attack depicted in FIG. 1. Finally, the rogue device sends dissociation and deauthentication frames to the client 425, as depicted in step 503. Flowchart 500 depicts an example of a "WLAN-jack" attack which keeps the client 425 from communicating to any device on the WLAN. Additionally, a DoS attack can be against an AP to keep it off the WLAN or a broadcast attack keeping all WLAN devices off the WLAN.

There are three common types of DoS attacks. First, RF jamming occurs when a wireless device is operating outside the IEEE 802.11 protocol in the 2.4 Ghz spectrum (e.g., bluetooth, RF cameras). IEEE 802.11 compatible products can monitor the spectrum for a clear channel by performing a clear channel assessment (CCA) before receiving or transmitting frames. Devices constantly transmitting nearby can cause this CCA to always return false and prevent the IEEE 802.11 device from using its radio as long as the channel contains energy (the non-IEEE 802.11 compatible devices is transmitting).

The second type of DoS attack, management frame spoofing, is the most common and effective forms of devices termination. This occurs inside the IEEE 802.11 protocol by exploiting non-authenticated management frames. Two types of frames (deauthentication and disassociation) are exchanged during normal wireless roaming and association between a station and an access point. These frames can be generated by a hacker containing the victim AP's and associated client's MAC addresses and transmitted into the air to simulate real frames. The hacker's generated frames get processed unchallenged and cause the devices to disconnect temporarily. Hackers can simulate this temporary-disconnect frame sequence over and over, thereby causing the victims to loose connectivity during the hackers transmission period.

The third type of DoS attack, control frame spoofing, is similar to management frame spoofing where control frames use the higher level control frames to create delay periods in the victim's transmission period. While control frame spoofing is not as effective as management frame spoofing, it can be used to throttle or severely limit the maximum throughput of a device.

Figure 6:
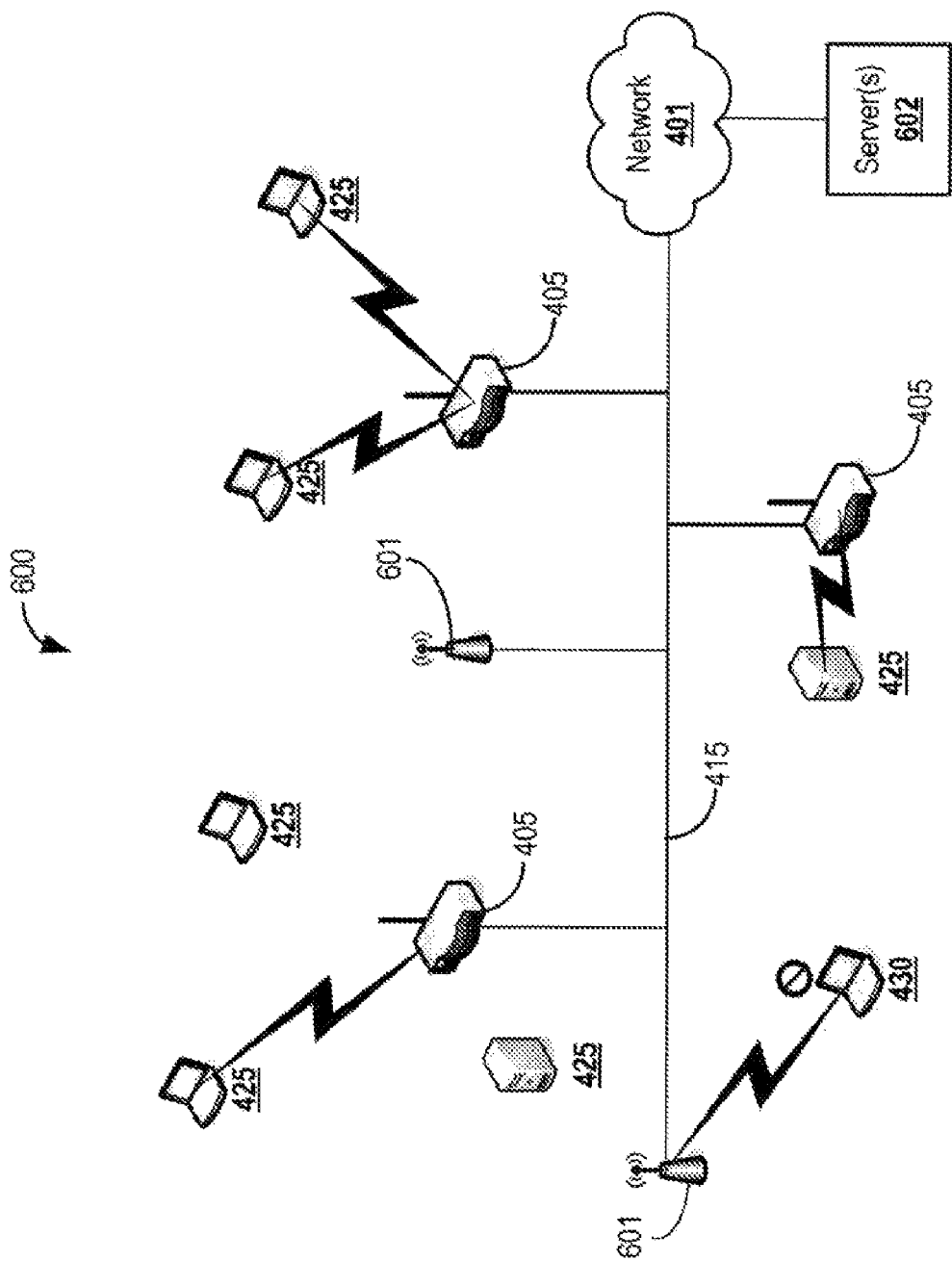
FIG. 6 is a block diagram of a WLAN network equipped with sensors and server(s) configured to provide wireless intrusion prevention.

FIG. 6 illustrates a WLAN network 600 equipped with sensors 601 and server(s) 602 configured to provide wireless intrusion prevention. The WLAN network 600 includes wireless APs 405 connected to a local area network (LAN) 415. The APs 405 are operable to provide wireless access to clients 425 through a wireless connection such as IEEE 802.11a/b/g. The LAN 415 can include an Ethernet connection and the LAN 415 connects to a network 401. The network 401 can include an Internet protocol (IP) network such as the Internet or a wide area network (WAN).

The sensors 601 are configured to monitor data transmitted on the WLAN network 600 and to provide relevant data, events, and statistics to the server(s) 602. the server(s) 602 is configured to receive and correlate data, events, and statistics from the sensors 601. Additionally in some examples, APs 405 and/or clients 425 can occasionally operate as sensors 601 and communicate data, events, and statistics to the server(s) 602. In other examples, clients 425 can be configured with software agents, allowing the clients 425 to periodically monitor the WLAN network 600 and to communicate data, events, and statistics from monitoring the WLAN network 600 to the server(s) 602.

The server(s) 602 can be configured to detect attacks and events, network performance degradation, and network policy compliance on the WLAN network 600. Further, the server(s) 602 may be configured to direct the sensors 601 to terminate a rogue wireless client (e.g. and unauthorized user). Also, the server(s) may include a data store to log history and trends relating to the wireless network 600. The combination of the server(s) 602 and sensors 601 can sometimes be called a wireless intrusion prevention system (WIPS). An example of a WIPS system is the AirDefense Enterprise Release 7.0 (available from the assignee, AirDefense, Inc. of Alpharetta, Ga.).

In the example WLAN network 600 of FIG. 6, a rogue device 430 is shown attempting to access the WLAN 600. The sensor 601 and server 602 can be configured to detect the rogue device 430. In one implementation, the sensors 601 and server(s) 602 can be configured to thwart breaking of WEP and WPA encryption. In another implementation or extensions of previous implementations, the sensors 601 and server (s) 602 can be configured to thwart denial-of-service, reconnaissance, insertion, and masquerade attacks.

Figure 7:
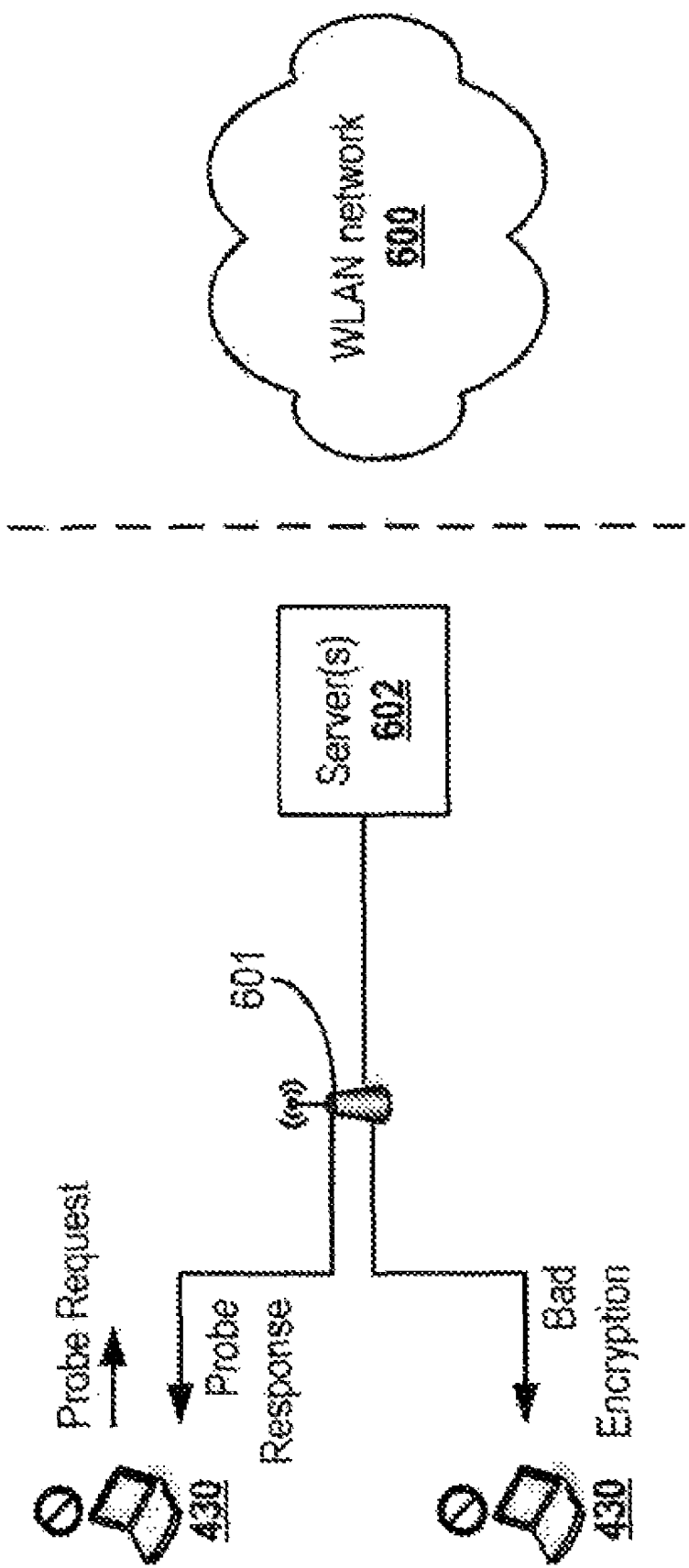
FIG. 7 is a block diagram showing a server connected to a sensor, the sensor being configured to proactively thwart attacks on a wireless network.

FIG. 7 illustrates an implementation that can include a server 602 connected to a sensor 601, wherein the sensor 601 can be configured to proactively thwart attacks on a wireless network 600. The server(s) 602 can direct one or more sensors 601 to transmit random WEP encrypted frames to confuse rogue devices 430 that are attempting to break a WEP key through brute force. Random WEP encrypted frames can be transmitted, for example, periodically, in response to an intrusion alarm, manually, automatically based on policy, or combinations thereof. An example policy may provide for random WEP encrypted frames to be transmitted if weak initialization vectors or known weak keys are used. Further, the sensors can scan several wireless channels and provide protection by propagating random WEP encrypted frames on the several wireless channels.

Cracking the WEP encryption can be done by sniffing frames and capturing clear text IV keys. One example of WEP cracking is the Fluhrer-Mantin-Shamir (FMS) attack which uses a probabilistic algorithm to crack the WEP key. The FMS crack scales linearly, which means that cracking a 128-bit key takes only slightly longer to crack then a 64-bit key, once the potential intruder has captured enough IV keys. To thwart the attack, the sensor 601 and server 602 can observe traffic between devices (e.g. AP and a client) and simulate data with a different WEP key and random initialization vectors, thereby confusing the WEP cracking algorithm. Such WEP protection can cloak the WEP encryption key and thereby significantly protects the key from being broken.

In another example, WEP injection protection/WEP replay protection can provide protection against injection type attacks and replay based attacks, which can be used by potential intruders to decode data packets and/or increase the amount of data initialization vectors in the air to facilitate WEP cracking. The server(s) 602, in conjunction with the sensors 601, can monitor for these specific types attacks and return a "false positive" frame to mislead the attack. The "false positive" frame can be used to lead the rogue device 430 to an invalid result.

With regards to WPA, a sensor 601 can inject random challenge-response frames to thwart attacks against authentication. For example, injecting random TKIP four-way handshake frames can thwart a dictionary attack on a WPA pre-shared key (PSK). This can be done periodically, in response to an intrusion alarm, manually, or automatically based on policy. TKIP is a secure protocol used in WPA which allowed WPA to replace WEP without replacing legacy hardware. For this reason, TKIP, like WEP, uses a key scheme based on RC4, but unlike WEP, TKIP provides per-packet key mixing, a message integrity check and a re-keying mechanism. TKIP thereby provides that every data packet is sent with its own unique encryption key.

For example, WPA protection provides protection against sniffing attacks against the WPA's PSKs and rogue devices 430 that have acquired credentials to monitor WPA-enterprise traffic. To monitor WPA, potential intruders monitor frames in real-time and rotate encryption keys when a handshake takes place between the client and AP. WPA protection can thwart an attack by transmitting a fake handshake and key exchanges to confuse and mislead the rogue device 430. The fake handshake can be transmitted by the sensor 601. The fake handshake can cause the rogue device 430 to rotate encryption keys and disable the device's sniffing capabilities. Further, WPA protection can also cloud the initial handshake between the device and AP by simulating fake handshakes when the real devices are already connected with proper handshakes. Because rogue devices 430 cannot detect the state of the connection, they will add the fake handshakes to their list of passwords to crack. Moreover, because the handshakes are fake, the passwords are fake, and are composed so as to be difficult to break using brute force methodology. Therefore the rogue devices 430 may be diverted into attempting to crack fake passwords.

In other implementations, the sensors 601 can transmit random probe requests in response to active reconnaissance probe requests. Additionally, the sensors 601 can be used to disrupt DoS, insertion, and masquerade attacks. In such implementations, the sensors 601 can transmit noise upon detection of an attack. Therefore, any frames that are received by clients 425 are received with errors, and are discarded before these frames can be acted upon. During a DoS attack, for example, transmission of noise can disrupt unauthorized dissociation frames. During an insertion attack, for example, spoofed multicast/broadcast frames are disrupted. Such mechanisms can be used to disrupt any unauthorized frames transmitted on the WLAN 600.

Additionally, in some cases wired (i.e. LAN) multicast/broadcast traffic leaks over onto the WLAN and can reveal the WLAN topology to a rogue device. For example, tools such as Yersinia (available from http://www.yersinia.net) can be used to inject bogus multicast frames such as spanning tree protocol in order to disrupt wired switches. Upon detection of leaking wired traffice, chaff frames can be transmitted to confuse insertion attack tools. The sensors 601 can be configured to detect leaking wired traffic and to inject chaff frames responsive to the detection.

Some APs allow unencrypted multicast frames (e.g. STP traffic) to be transmitted onto the wired network. The leaking of wired side multicast frames into the wireless allows hackers to locate wired switches and other network devices and services. Using a tool like Yersinia, a hacker can capture multicast frames and re-inject modified versions of the same packets to create wired DoS attacks and change the network topology. The injection protection can create random frames and transmit the random frames obscure the real frames. Injection protection can also help to reverse the damages caused by the injection. To reverse the damages caused by the insertion, a sensor can undo any changes made by the hacker. For example, if the hacker turns the switch port into a trunk port, a sensor can transmit the inverse frame to reverse the state of the device.

The sensors 601 and server(s) 602 can be configured to perform these protection techniques in addition to providing wireless intrusion monitoring and prevention. Further, a stand-alone wireless radio can be used to solely to provide protection. For example, the wireless radio can be configured to transmit random WEP encrypted frames to prevent the brute force breaking of the keys.

Further, the sensors 601 can be configured to disrupt any wireless frames on the wireless network 600. For example, one of the sensors 601 can read the first few initial bits of a wireless frame to determine the source address, destination address, and the frame type. If the sensor 601 or the server 602 determines the frame is an unauthorized frame or an attack frame, then the sensor 601 can transmit noise in the body of the wireless frame. When the frame is received by a wireless client, it is discarded because of the noise and the client does not decode the frame avoiding any potential damage from an unauthorized or attack frame. This can be done responsive to attacks or detection of unauthorized frames.

Figure 8:
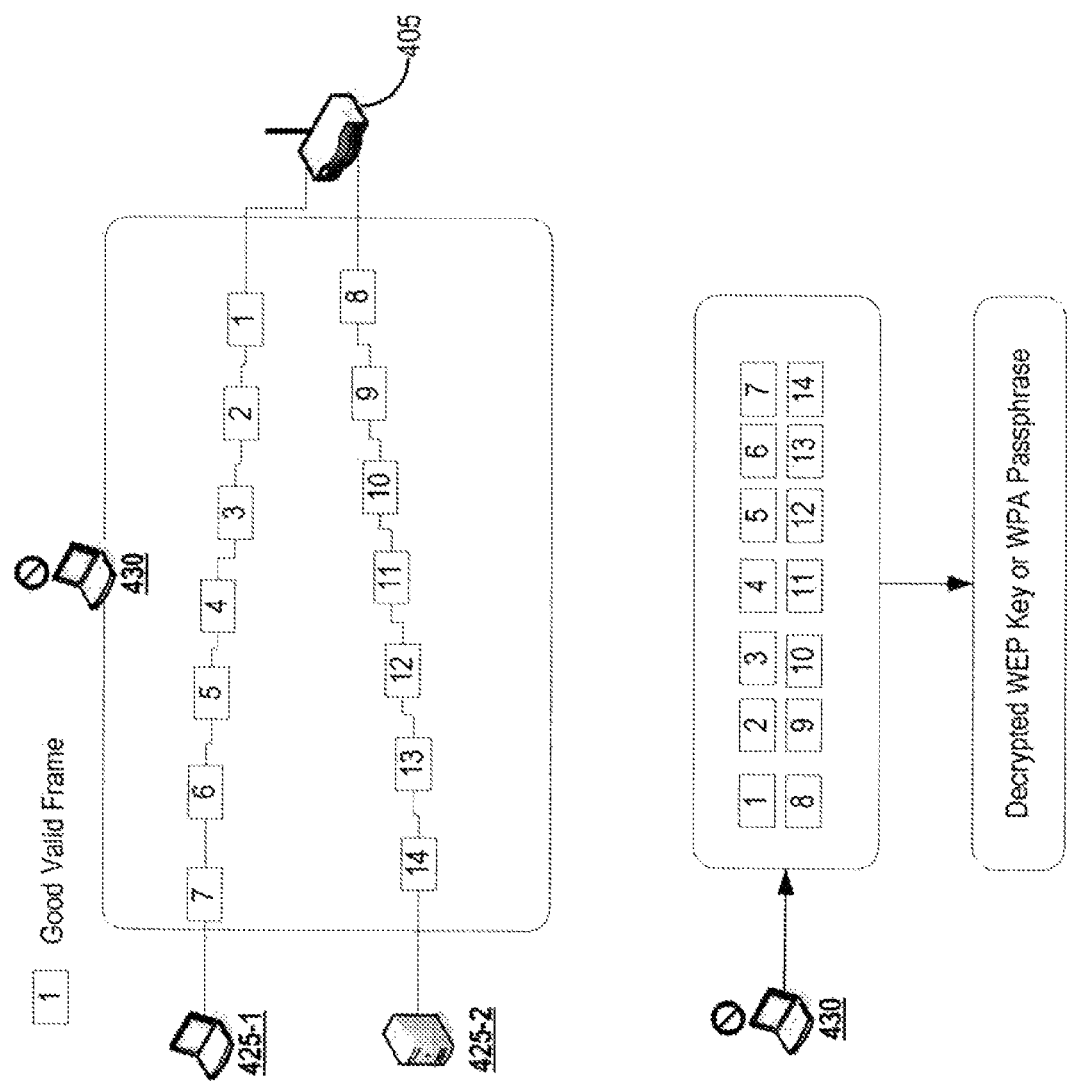
FIG. 8 is a block diagram depicting a rogue device sniffing frames between clients and an AP in order to decrypt the WEP key or WPA passphrase on a wireless network.

FIG. 8 illustrates a rogue device 430 used to sniff frames between clients 425-1, 425-2 and an AP 405. The rogue device 430 sniffs these frames in order to decrypt the WEP key or WPA passphrase on a wireless network. The client 425-1 can transmits frames 1 through 7 to the AP 405 and another client 425-2 can transmit frames 8 through 14. All the frames 1-14 are valid frames with either WEP or WPA encryption. The rogue device 430 is used to sniff the frames and thereafter store the captured frames. Once enough frames are captured and stored, the rogue device 430 can decrypt the WEP key or the WPA passphrase using either brute force or mathematical attacks. Once the WEP key or WPA passphrase is decrypted, then the rogue device 430 can attack the wireless network.

Figure 9:
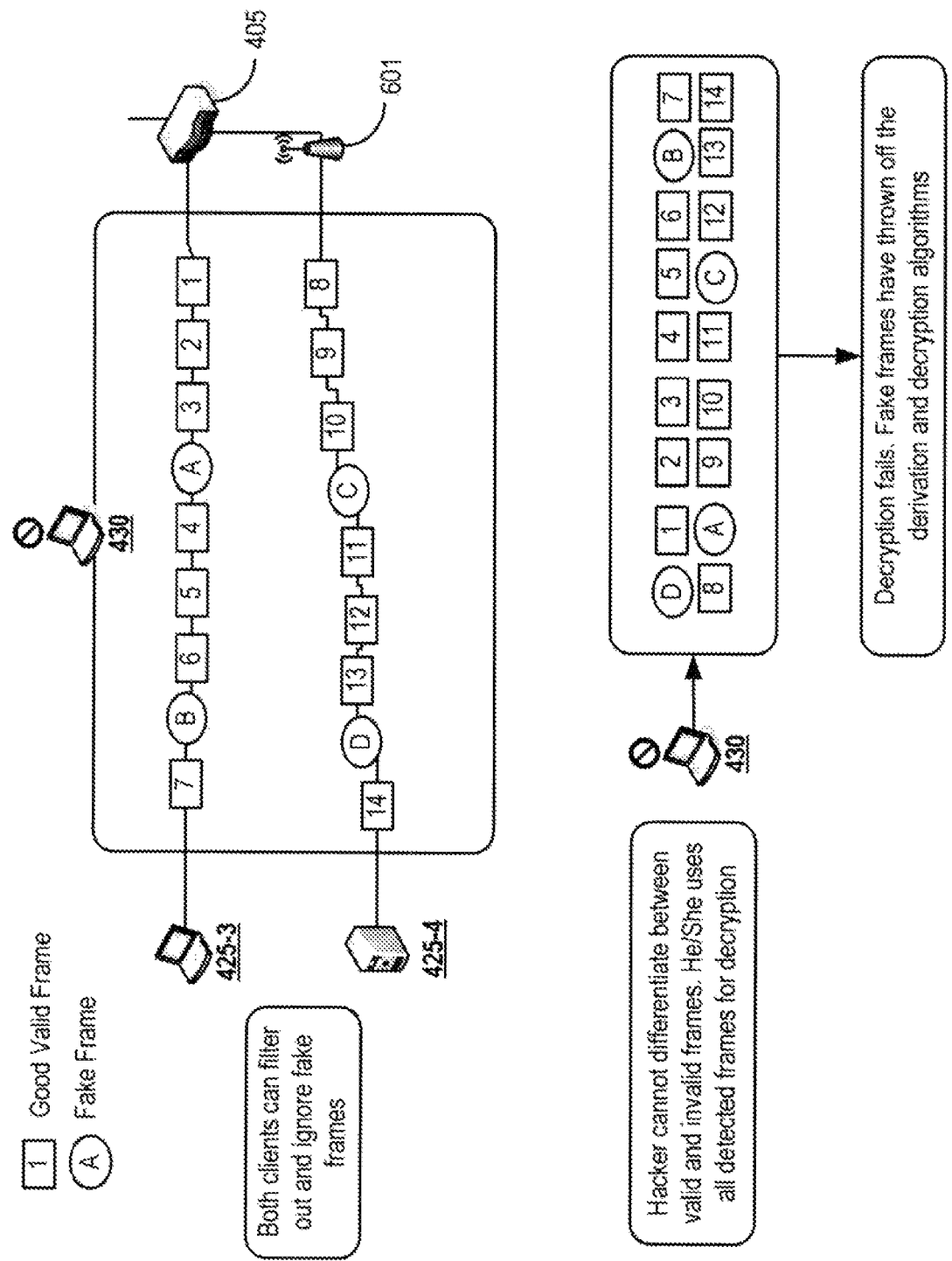
FIG. 9 is a block diagram depicting transmission of random, fake frames along with valid frames to disrupt decryption of a WEP key or a WPA passphrase on a wireless network.

FIG. 9 illustrates an example embodiment of the present disclosure to transmit random, fake frames along with valid frames to prevent decryption of the WEP key or WPA passphrase on a wireless network. Client 425-3 transmits frames 1 through 7 to an AP 405, but a sensor 601 transmits random frames A, B among the transmission of frames 1 through 7. Additionally, Client 425-4 transmits frame 8 through 14 and the AP also transmits random frames C, D among the transmission of frames 8 through 14. The clients 425-3, 425-4 can filter out and ignore the random, fake frames. However, a rogue device 430 cannot differentiate between valid and random fake frames.

The rogue device 430 sniffs the transmitted frames including the valid frames 1-14 and the random, fake frames A, B, C, D. The rogue device 430 uses all sniffed frames for decrypting the WEP key or WPA passphrase. Here, the random, fake frames A, B, C, D can throw off the decryption such that the rogue device cannot break the WEP key or WPA passphrase. On WEP protected networks, the random, fake frames are specially crafted to look like valid data with a different encryption key. For WPA protected networks, the handshakes (i.e. EAPOL management frames) are forged instead of the data frames.

The systems and methods disclosed herein may use data signals conveyed using networks (e.g., local area network, wide area network, internet, etc.), fiber optic medium, carrier waves, wireless networks, etc. for communication with one or more data processing devices (e.g., media systems). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

These and other implementations are within the scope of the following claims.

What is claimed is:

1. A method of disrupting attempts to break encryption or authentication associated with a wireless network, the method comprising the steps of:
monitoring the wireless network to detect weak initialization vectors, wherein the weak initialization vectors are weak due to reuse over a specified time period on the wireless network;
monitoring the wireless network to detect known wired equivalent privacy keys being used; and
transmitting random wired equivalent privacy encrypted frames on the wireless network responsive to the monitoring steps, the random wired equivalent privacy encrypted frames are operable to confuse unauthorized devices attempting to capture wired equivalent privacy encrypted frames to break the wired equivalent privacy key, wherein the random wired equivalent privacy encrypted frames each comprise random data encrypted with a different wired equivalent privacy key and random initialization vectors generated at a rate derived in response to monitored traffic, and wherein the random initialization vectors are different from monitored initialization vectors but logically correct and in sequence, wherein the random initialization vectors are invalid packets and are configured to pass validity checks while preventing an attacker to filter out the invalid packets thereby preventing decryption of the wired equivalent privacy key;
wherein the monitoring step is performed by a plurality of distributed monitoring devices, the plurality of monitoring devices are connected to one or more servers; and
wherein the servers are operable to receive and correlate data, events, and statistics from the distributed monitoring devices and to direct the distributed monitoring devices to perform the transmitting step responsive to any of a periodic interval, an intrusion alarm, a manual request, and an automatic request based on policy.

2. The method of claim 1, wherein the condition comprises any of a periodic interval, an intrusion alarm, a manual request, and an automatic request based on policy.

3. The method of claim 1, wherein the plurality of distributed monitoring devices comprise any of wireless sensors, wireless access points, wireless client devices configured with a software agent, and combinations thereof.

4. The method of claim 1, wherein the monitoring step and the transmitting step are performed by a stand-alone wireless radio.

5. The method of claim 1, wherein the monitoring step and the transmitting step are performed simultaneously on a plurality of wireless channels.

6. The method of claim 1, wherein the condition is an injection attack.

7. A method of thwarting an attack designed to obtain a secret passphrase of a Wi-Fi protected access wireless network, the method comprising the steps of:
monitoring the wireless network to detect a rogue device monitoring the Wi-Fi protected access wireless network for keys;
transmitting challenge-response frames on the wireless network responsive to the monitoring step, the challenge-response frames are operable to thwart attacks designed to obtain the secret passphrase, and wherein the challenge-response frames comprise a fake handshake using SNonce and ANonce transmissions during a four way handshake and key exchange designed to obfuscate actual challenge-response frames from the rogue device monitoring the wireless network; and
periodically simulating fake handshakes when authorized devices are already connected with proper handshakes;
wherein the monitoring step is performed by a plurality of distributed monitoring devices, the plurality of monitoring devices are connected to one or more servers; and
wherein the servers are operable to receive and correlate data, events, and statistics from the distributed monitoring devices and to direct the distributed monitoring devices to perform the transmitting step responsive to any of a periodic interval, an intrusion alarm, a manual request, and an automatic request based on policy.

8. The method of claim 7, wherein the plurality of distributed monitoring devices comprise any of wireless sensors, wireless access points, wireless client devices configured with a software agent, and combinations thereof.

9. The method of claim 7, wherein the monitoring step and the transmitting step are performed by a stand-alone wireless radio.

10. A method of disrupting attempts to break encryption or authentication associated with a wireless network, the method comprising the steps of:
receiving a protection request from a monitoring device responsive to detecting weakness due to reuse over a specified time period on the wireless network, the protection request comprising an instruction to protect a wireless network from any of a plurality of wireless attacks;
transmitting random protection frames on the wireless network based upon the protection request, the random protection frames being operable to confuse unauthorized devices attempting to collect information from the wireless network, wherein the random protection frames comprising one of random wired equivalent privacy encrypted frames and forged Wi-Fi protected access handshake frames;
wherein the random wired equivalent privacy encrypted frames each comprise simulated data with a different wired equivalent privacy key and random initialization vectors generated at a rate derived in response to monitored traffic, and wherein the random initialization vectors are different from monitored initialization vectors but logically correct and in sequence, and wherein the random initialization vectors are invalid packets and are configured to pass validity checks while preventing an attacker to filter out the invalid packets thereby preventing decryption; and
wherein weak initialization vectors are reused during a streaming cipher.

11. The method of claim 10, further comprising determining which of a plurality of types of random protection frames to transmit based upon the protection request.

12. The method of claim 10, further comprising signaling the protection request based upon a periodic schedule.

13. The method of claim 10, further comprising:
detecting an unauthorized device attempting to attack the wireless network; and signaling the protection request based on detecting an unauthorized device attempting to attack the wireless network.

14. The method of claim 10, further comprising receiving an intrusion alert from any of a plurality of wireless monitoring devices; and
   signaling the protection request based upon the intrusion alert.

15. The method of claim 1, wherein the weak initialization vectors comprise a 24 bit initialization vector.

16. The method of claim 1, wherein the weak initialization vectors are reused during a streaming cipher.

17. The method of claim 10, wherein the monitored initialization vectors comprise a 24 bit initialization vector.

* * * * *

UNITED STATES PATENT AND TRADEMARK OFFICE
CERTIFICATE OF CORRECTION

PATENT NO. : 8,281,392 B2
APPLICATION NO. : 11/464043
DATED : October 2, 2012
INVENTOR(S) : Sinha et al.

It is certified that error appears in the above-identified patent and that said Letters Patent is hereby corrected as shown below:

On Page 3, item (56), under "FOREIGN PATENT DOCUMENTS", in Column 2, Line 6, delete "7/2002" and insert -- 10/2002 --, therefor.

On Page 4, item (56), under "OTHER PUBLICATIONS", in Column 1, Line 61, delete "AiroPeek AiroPeek" and insert -- AiroPeek --, therefor.

On Page 5, item (56), under "OTHER PUBLICATIONS", in Column 1, Line 50, delete "Securily" and insert -- Security --, therefor.

On Page 5, item (56), under "OTHER PUBLICATIONS", in Column 2, Line 1, delete "Asess1ng w1re1ess" and insert -- Assessing wireless --, therefor.

On Page 5, item (56), under "OTHER PUBLICATIONS", in Column 2, Line 3, delete "Secur1ty.pdf" and insert -- Security.pdf --, therefor.

In Column 5, Line 27, delete "had" and insert -- has --, therefor.

In Column 6, Line 37, delete "anthentication" and insert -- authentication --, therefor.

In Column 6, Line 48, delete "AirSnark" and insert -- AirSnarf --, therefor.

In Column 7, Line 34, delete "configures" and insert -- configured --, therefor.

In Column 8, Line 9, delete "of" and insert -- or --, therefor.

In Column 8, Line 16, delete "deice" and insert -- device --, therefor.

In Column 9, Line 15, delete "simulate" and insert -- stimulate --, therefor.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,281,392 B2

In Column 10, Line 28, delete "includes" and insert -- include --, therefor.

In Column 10, Line 49, delete "http://www.effetech.com/aps/)." and insert -- http://www.effetech.com/aps/), --, therefor.

In Column 11, Line 46, delete "602. the" and insert -- 602. The --, therefor.

In Column 11, Line 60, delete "and" and insert -- an --, therefor.

In Column 12, Line 54, delete "secure" and insert -- security --, therefor.

In Column 13, Line 34, delete "traffice," and insert -- traffic, --, therefor.